US010632666B2

(12) United States Patent
Hirota et al.

(10) Patent No.: US 10,632,666 B2
(45) Date of Patent: Apr. 28, 2020

(54) PARISON SUPPLY DEVICE AND SUPPLY METHOD, AND BLOW MOLDING MACHINE AND BLOW MOLDING METHOD USING SAME

(71) Applicant: TOYO SEIKAN CO., LTD, Tokyo (JP)

(72) Inventors: Norihisa Hirota, Kanagawa (JP); Atsushi Yoneda, Kanagawa (JP); Kouichi Narutaki, Kanagawa (JP); Akihiro Usami, Kanagawa (JP); Eiichiro Kaneko, Kanagawa (JP); Takuo Yamada, Kanagawa (JP); Youtarou Takahashi, Kanagawa (JP); Ikuo Komatsu, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 187 days.

(21) Appl. No.: 15/323,877

(22) PCT Filed: Jul. 27, 2015

(86) PCT No.: PCT/JP2015/071253
§ 371 (c)(1),
(2) Date: Jan. 4, 2017

(87) PCT Pub. No.: WO2016/021435
PCT Pub. Date: Feb. 11, 2016

(65) Prior Publication Data
US 2017/0173842 A1 Jun. 22, 2017

(30) Foreign Application Priority Data

Aug. 4, 2014 (JP) .................................. 2014-159086
Sep. 24, 2014 (JP) .................................. 2014-194497
(Continued)

(51) Int. Cl.
*B29C 49/42* (2006.01)
*B29C 49/04* (2006.01)
(Continued)

(52) U.S. Cl.
CPC .......... *B29C 49/4205* (2013.01); *B29C 49/04* (2013.01); *B29C 49/10* (2013.01);
(Continued)

(58) Field of Classification Search
None
See application file for complete search history.

(56) References Cited

U.S. PATENT DOCUMENTS 3,872,203 A    3/1975  Yoshikawa et al.
4,153,408 A *  5/1979  Albert ..................... B29C 49/32
                                                      425/532
(Continued)

FOREIGN PATENT DOCUMENTS

CN    101015955    8/2007
DE    1 479 557    7/1969
(Continued)

OTHER PUBLICATIONS

Office Action dated Jul. 26, 2018 in Japanese Patent Application No. 10-2017-7002182, with English-language translation.
(Continued)

*Primary Examiner* — Monica A Huson
(74) *Attorney, Agent, or Firm* — Wenderoth, Lind & Ponack, L.L.P.

(57) ABSTRACT

A blow molding capable of maintaining the parison thickness distribution uniform, fabricating high-quality molded products, and improving its productivity. A parison supply device for supplying, to a blow mold, a parison discharged from an extrusion die, the parison supply device including: a pair of chucks for pinching, from above and below, a parison discharged downward from the extrusion die; and a chuck operation part for controlling an operation of pinching the parison by the pair of chucks and an operation of moving the pair of chucks. By the chuck operation part, the pair of chucks performs the operation of pinching the parison while being moved downward.

24 Claims, 18 Drawing Sheets

(30) Foreign Application Priority Data

Sep. 25, 2014 (JP) ................................ 2014-195860
Oct. 27, 2014 (JP) ................................ 2014-218742

(51) Int. Cl.
*B29C 49/10* (2006.01)
*B29C 49/28* (2006.01)
*B29C 49/36* (2006.01)
*B29C 49/70* (2006.01)
*B29C 49/58* (2006.01)
*B29K 105/00* (2006.01)
*B29L 31/00* (2006.01)

(52) U.S. Cl.
CPC .............. *B29C 49/28* (2013.01); *B29C 49/42* (2013.01); *B29C 49/36* (2013.01); *B29C 49/70* (2013.01); *B29C 2049/5844* (2013.01); *B29C 2793/0027* (2013.01); *B29C 2793/0081* (2013.01); *B29K 2105/253* (2013.01); *B29L 2031/7158* (2013.01)

(56) References Cited

U.S. PATENT DOCUMENTS

| | | | | |
|---|---|---|---|---|
| 4,233,019 A * | 11/1980 | Sawa | ................ | B29C 49/14 |
| | | | | 264/532 |
| 6,176,699 B1 | 1/2001 | Franjo et al. | | |
| 9,636,865 B2 * | 5/2017 | Hirota | ................ | B29C 49/4205 |
| 2014/0170353 A1 | 6/2014 | Kreager et al. | | |

FOREIGN PATENT DOCUMENTS

| | | |
|---|---|---|
| EP | 2 990 177 | 3/2016 |
| JP | 52-100566 | 8/1977 |
| JP | 54-34372 | 3/1979 |
| JP | 2-6120 | 1/1990 |
| JP | 2-80225 | 3/1990 |
| JP | 06-293059 | 10/1994 |
| JP | 2000-318023 | 11/2000 |
| JP | 2014-213513 | 11/2014 |

OTHER PUBLICATIONS

Office Action dated Jul. 26, 2018 in Korean Patent Application No. 10-2017-7002182, with English-language translation.
The First Office Action dated Jun. 5, 2018 in Chinese Patent Application No. 201580041013.6, with English Translation.
International Search Report dated Sep. 15, 2015 in International (PCT) Application No. PCT/JP2015/071253.
Written Opinion of the International Searching Authority dated Sep. 15, 2015 in International Application No. PCT/JP2015/071253, with English translation.
Extended European Search Report dated Jan. 17, 2018 in European Patent Application No. 15830424.6.
Office Action dated Apr. 19, 2019 in Korean Patent Application No. 10-2019-7006542 with English translation.
Office Action dated Feb. 2, 2019 in Chinese Patent Application No. 201580041013.6 with English translation.
Notification of Reason for Refusal dated Oct. 29, 2019 in Korean Patent Application No. 10-2019-7006542 with English translation.

* cited by examiner (PLAN)

(X-X CROSS SECTION)

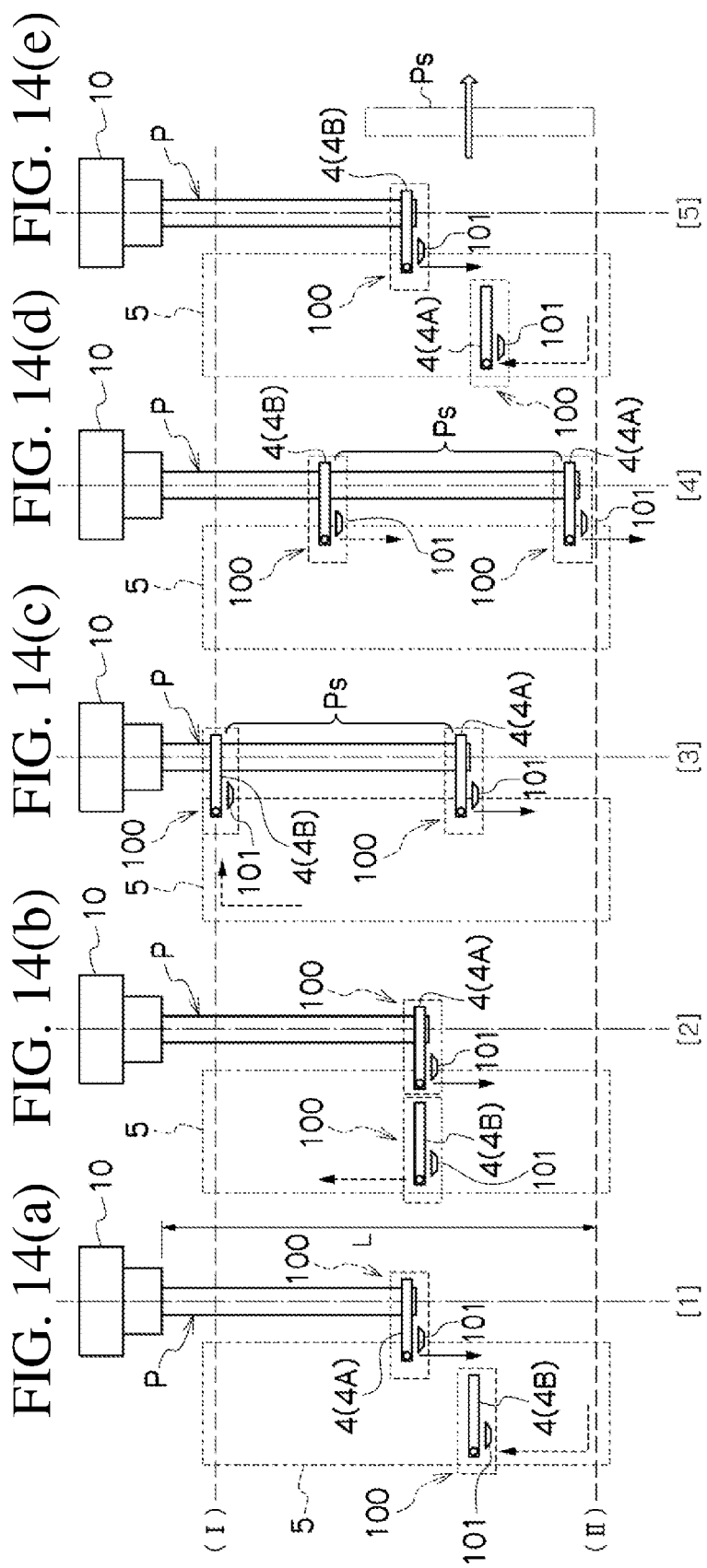

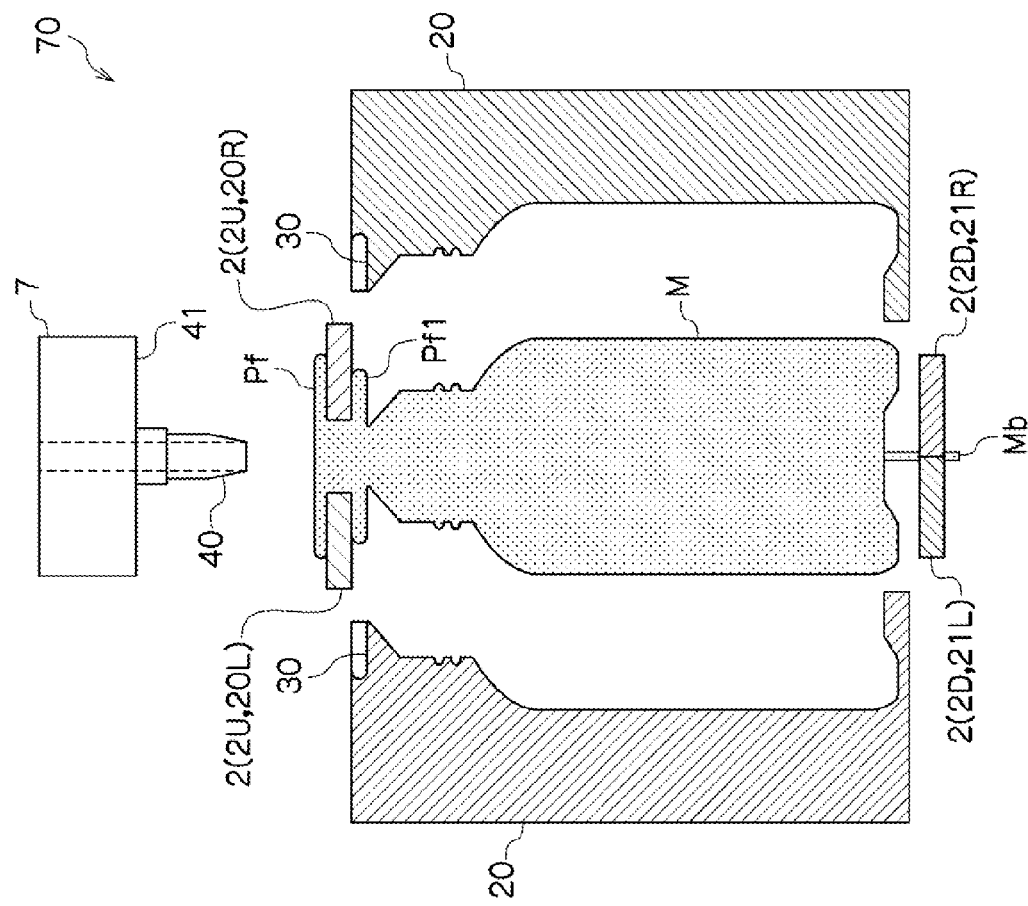
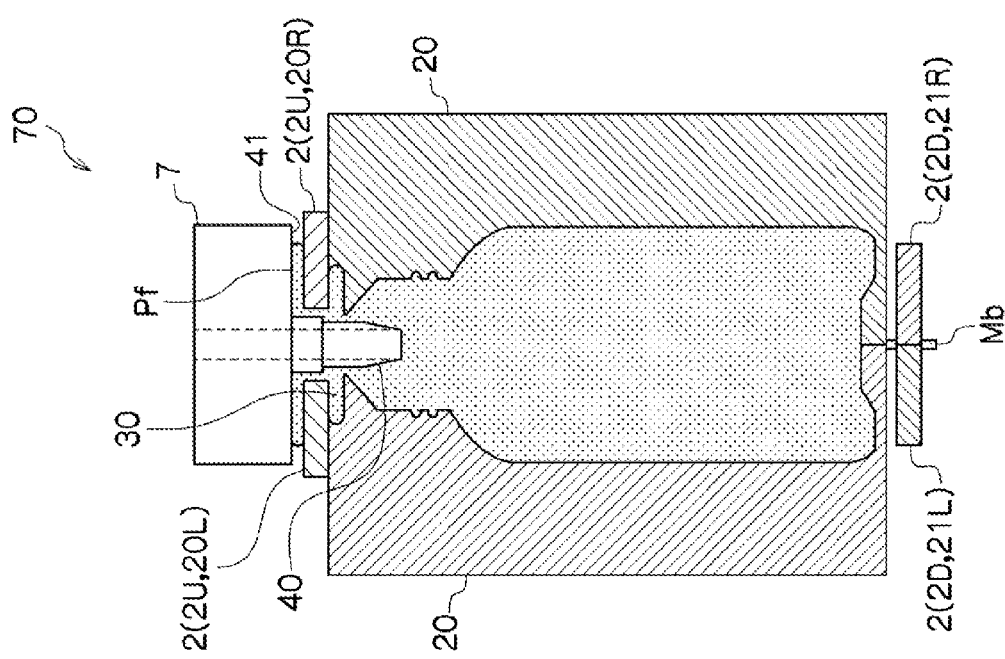

PARISON SUPPLY DEVICE AND SUPPLY METHOD, AND BLOW MOLDING MACHINE AND BLOW MOLDING METHOD USING SAME

TECHNICAL FIELD

The present invention relates to a parison supply device and parison supply method for supplying, to a blow mold, a parison discharged from an extrusion die in blow molding process, as well as to a blow molding machine and blow molding method using the parison supply device and parison supply method.

BACKGROUND ART

The blow molding refers to a process of molding a hollow product by clipping, with a blow mold, a hollow pipe-shaped thermoplastic molten discharged material (hereinafter, referred to as parison) discharged from an extrusion die and by blasting a blow air inward of the in-mold parison.

As a method of delivering the parison to the blow mold, there is described a related art in PTL 1 shown below in which simultaneously when a parison extrusion-molded vertically downward is pinched at near its lower end by a lower chuck, the parison is cut and pinched concurrently at a portion between the lower chuck and a molding die by a cutting edge-equipped upper chuck, and then the molten parison, while held by the upper-and-lower chucks, is moved horizontally as it is so as to be inserted into the mold for blow molding. On the way of the insertion, the lower chuck is moved downward so that a sag of the molten parison due to its drawdown is absorbed while a thinner parison is made at the same time. The parison is then delivered to the blow mold.

CITATION LIST

Patent Literature

PTL 1: JP S54-34372 A

SUMMARY OF INVENTION

Technical Problem

According to the above-described related art, by the operation of pinching, with the upper-and-lower chucks, the parison extruded vertically downward from the extrusion die, it is made possible to supply the parison to the blow mold in a stable state. Moreover, by moving the lower chuck downward after the pinching of the parison with the upper-and-lower chucks, it is made possible to absorb sags due to drawdown of the parison and lessen the parison diameter at the same time.

With the related art, however, the upper-and-lower chucks pinch the parison at a stationary height position relative to the parison that is lowering at a specified speed downward from the extrusion die. For this reason, there occurs a phenomenon that an outer surface of the parison and inner surfaces of the chucks rub against each other upon contact of the chucks with the parison. Moreover, immediately after the pinching of the parison with the chucks, there occurs another phenomenon that parison accumulations are formed on the chucks. Due to this, it has so far been impossible to obtain a parison thickness distribution uniformized with high precision, causing such problems as deteriorated quality of molded products and an impossibility of achieving blow molding with enhanced productivity.

Coping with such problems exemplifies objects of the present invention. That is, an object of the invention is to avoid such phenomena as rubbing between an outer surface of the parison and inner surfaces of the chucks upon contact of the chucks with the parison as well as formation of parison accumulations on the chucks immediately after the pinching of the parison by the chucks, thereby making it possible to maintain the parison thickness distribution uniform, fabricate high-quality molded products, fulfill a blow molding with enhanced productivity, and so on.

Solution to Problem

In order to accomplish these and other objects, the present invention has the following constitutions.

The invention provides a parison supply device for supplying, to a blow mold, a parison discharged from an extrusion die, the parison supply device including: a pair of chucks for pinching, from above and below, a parison discharged downward from the extrusion die; and a chuck operation part for controlling an operation of pinching the parison by the pair of chucks and an operation of moving the pair of chucks, wherein by the chuck operation part, the pair of chucks perform the operation of pinching the parison while being moved downward.

Advantageous Effects of Invention

The present invention having such features as described above, the speed difference between the downward moving chuck and the lowering parison becomes smaller upon contact of the chuck with the parison, make it possible to avoid a phenomenon that the outer surface of the parison and the inner surface of the chuck rub against each other as well as a phenomenon that accumulations of parison are formed on the chuck immediately after gripping of the parison by the chuck. Thus, the parison thickness distribution can be maintained uniform, high-quality molded products can be fabricated, and the productivity can be improved.

BRIEF DESCRIPTION OF DRAWINGS

FIGS. 14(a)-14(e) are explanatory views showing an operation example of downward movement of the parison supply device (operating state views relative to time elapse);

FIGS. 18(a) and 18(b) are explanatory views showing another configurational example in the blow molding method.

DESCRIPTION OF EMBODIMENTS

Figure 1:
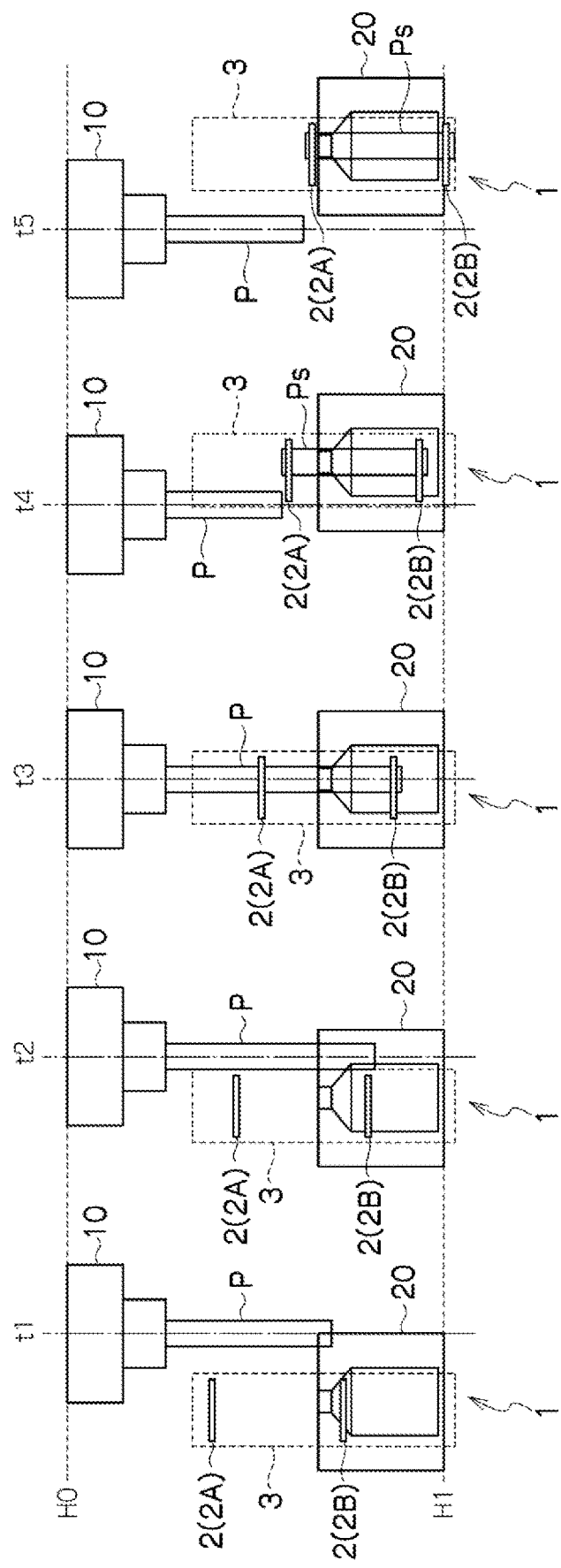
FIG. 1 is an explanatory view showing a parison supply device and parison supply method according to one embodiment of the invention.

Hereinafter, embodiments of the present invention will be described with reference to the accompanying drawings (throughout the accompanying drawings, common component members are designated by the same reference signs and their overlapping description is omitted). FIG. 1 shows a parison supply device and parison supply method according to one embodiment of the invention. The parison supply device 1 supplies, to a blow mold 20, a parison P discharged from an extrusion die 10 in blow molding process. The parison supply device 1 includes a pair of chucks 2 (upper chuck 2A and lower chuck 2B) for pinching, from above and below, the parison P discharged downward from the extrusion die 10, and a chuck operation part 3 for controlling an operation of pinching the parison P by the pair of chucks 2, and an operation of movement of the pair of chucks 2.

In this case, the chuck operation part 3 is so controlled that an operation of pinching the parison P by the pair of chucks 2 and an operation of the pair of chucks 2 moving downward are combined together, where the pair of chucks 2 perform an operation of pinching the parison while moving downward. More specifically, the chuck operation part 3 simultaneously performs an operation of moving positions of the upper chuck 2A and the lower chuck 2B relative to a reference height position H0 at which the extrusion die 10 is placed (or a reference height position H1 at which the blow mold 20 is placed), as well as an operation of pinching the parison P by the upper chuck 2A and the lower chuck 2B, and then cuts off a parison segment Ps pinched by the pair of chucks 2 from the parison P discharged from the extrusion die 10. In this process, an operation of making the upper chuck 2A and the lower chuck 2B approaching the parison P may be added to the operation of pinching the parison P by the upper chuck 2A and the lower chuck 2B.

In the case shown in the drawings, there are set timings t1 and t2 at which the pair of chucks 2 approach the discharged parison P, a timing t3 at which the pair of chucks 2 pinch the discharged parison P, a timing t4 at which the parison segment Ps pinched by the pair of chucks 2 is separated from the discharged parison P, and a timing t5 at which the parison segment Ps pinched by the pair of chucks 2 is supplied to the blow mold 20, under which condition both the upper chuck 2A and the lower chuck 2B are moved downward gradually between the timings t1 to t4.

In the above processes, the upper chuck 2A and the lower chuck 2B may be moved as they remain having a constant distance therebetween, or may be moved while the distance between the upper chuck 2A and the lower chuck 2B continues to be varied (while moving speeds of the upper chuck 2A and the lower chuck 2B are differently varied). For example, the pair of chucks 2 may be moved downward while the distance between the upper chuck 2A and the lower chuck 2B is being widened gradually, and the parison P, after pinched by the pair of chucks 2, may be supplied to the blow mold 20 with a pull applied to the parison segment Ps.

It is also allowable that the pair of chucks 2 are maintained in constant positions relative to the reference height position H0 or H1 at the timings t1 and t2 at which the pair of chucks 2 approach the discharged parison P, and then the pair of chucks 2 are moved downward immediately before or after the timing t3 at which the pair of chucks 2 pinch the discharged parison P.

As to a parison supply method with use of the parison supply device 1 having such features as described above, at a step in which the parison P discharged downward from the extrusion die 10 is pinched by the upper-and-lower pair of chucks 2, the pinching operation of the parison P is carried out while the pair of chucks 2 are being moved downward. Therefore, when the pair of chucks 2 come into contact with the parison P, a speed difference between the downward moving pair of chucks 2 and the lowering parison P becomes smaller, making it possible to avoid the phenomenon of rubbing between the outer surface of the parison P and the inner surfaces of the pair of chucks 2 as well as the phenomenon that parison accumulations are formed on the pair of chucks 2 immediately after the pinching of the parison P by the pair of chucks 2.

In the step of pinching the parison P by the upper-and-lower pair of chucks 2, the operation of moving the pair of chucks 2 downward by the chuck operation part 3 is preferably performed in accordance with the lowering speed of the parison P. More preferably, the moving speed of the pair of chucks 2 and the lowering speed of the parison P are set equal to each other. However, even though their speeds are not equal to each other, setting their speeds close to each other allows an advantageous effect to be obtained.

The parison supply method with use of the parison supply device 1 includes a parison conveyance step in which, after the step of pinching the parison P by the upper-and-lower pair of chucks 2, the chuck operation part 3 moves the pair of chucks 2, which are pinching the parison P, upward and downward, respectively, of the blow mold 20.

In the parison conveyance step, the chuck operation part 3 may move the pair of chucks 2, which are pinching the parison segment Ps, upward and downward, respectively, of the blow mold 20 while maintaining a constant distance between the pair of chucks 2. Otherwise, as already described above, the chuck operation part 3 may move the pair of chucks 2, which are pinching the parison segment Ps, upward and downward, respectively, of the blow mold 20 while widening the distance between the pair of chucks 2.

A mechanism for moving the upper chuck 2A and the lower chuck 2B independently of each other may be additionally provided in the chuck operation part 3. In this case, in the parison conveyance step, the chuck operation part 3 can move the pair of chucks 2 (upper chuck 2A and the lower chuck 2B), independently of each other, in an up/down direction (vertical direction) or in a direction crossing the up/down direction (horizontal direction), relative to the blow mold 20.

Figure 2:
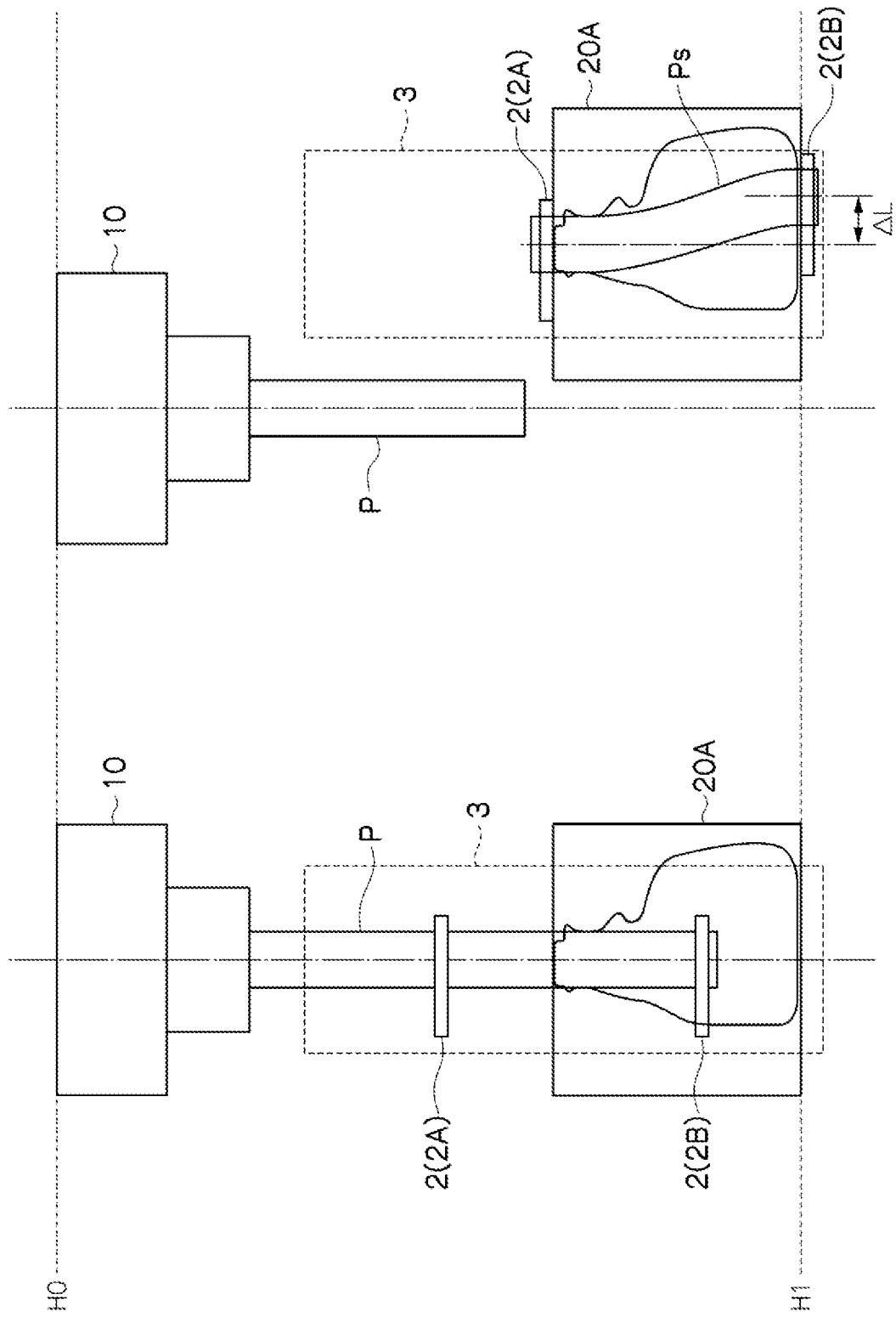
FIG. 2 is an explanatory view showing an operation example of the chuck operation part in a parison conveyance step in one embodiment of the invention, which is an example of application to molding of an asymmetrical bottle.

FIG. 2 shows an operation example of the chuck operation part 3 in the parison conveyance step. Shown in this case is an example in which the parison P is conveyed to a blow mold 20A for molding an asymmetric bottle. The chuck operation part 3 in this example provides a horizontal moving extent of the lower chuck 2B shifted by A L relative to a horizontal moving extent of the upper chuck 2A, the shift being effectuated during the process in which the upper chuck 2A is moved upward of the blow mold 20A while the lower chuck 2B is moved downward of the blow mold 20A in order to supply the parison segment Ps in an inclined state to the asymmetrical-shaped blow mold 20A after the pinching of the parison P by the pair of chucks 2.

In this case, the parison segment Ps pinched by the pair of chucks 2 can be supplied to the blow mold 20A in an inclined or curved state so as to fit to the shape of the blow mold 20A. Therefore, the thickness of the asymmetric bottle can be properly controlled without inclining the blow mold 20A. Also, since the chuck operation part 3 moves the upper chuck 2A and the lower chuck 2B independently of each other, the upper chuck 2A and the lower chuck 2B can be positioned each separately. This makes it possible to properly and simply adjust the positions of the pair of chucks 2 relative to the blow mold 20A of various shapes.

Figure 3:
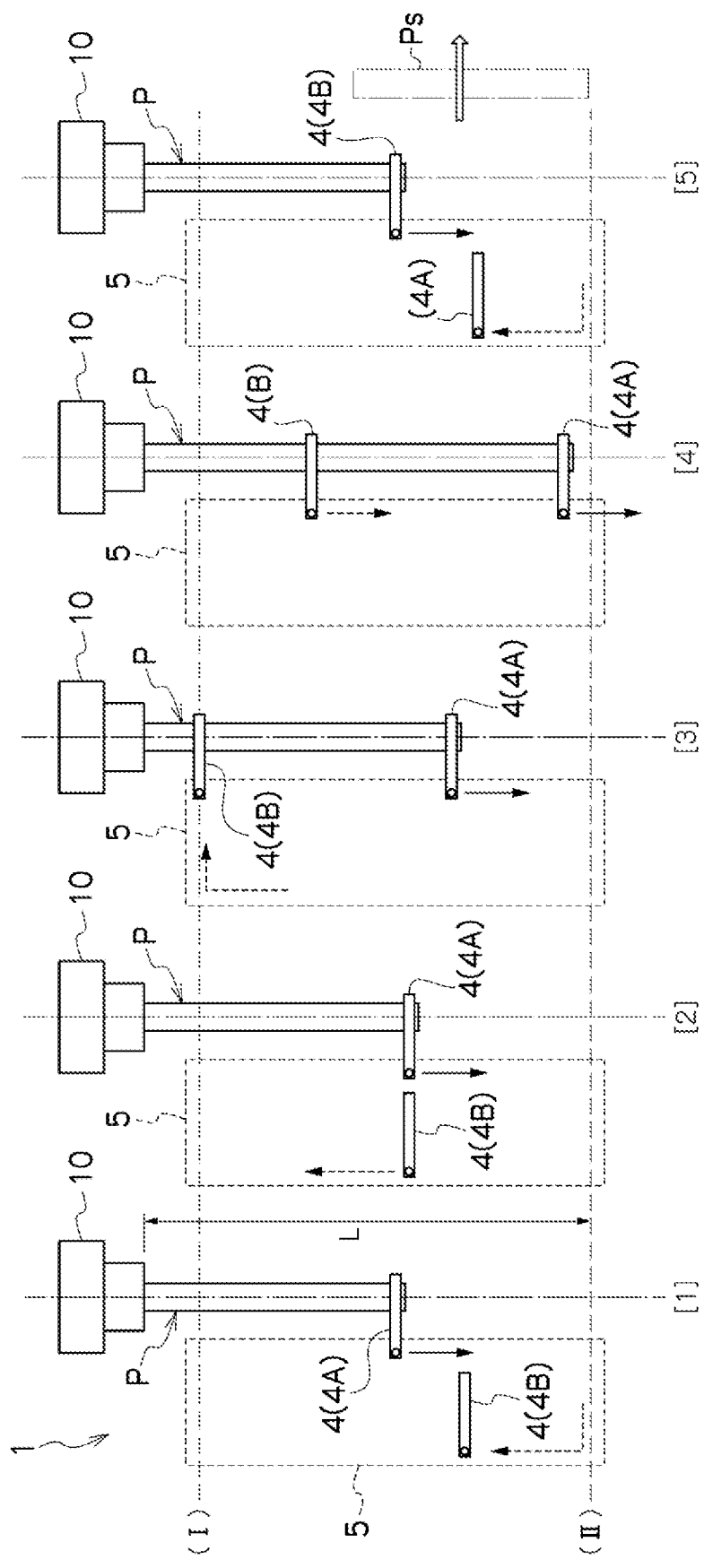
FIGS. 3(a)-3(e) are explanatory views showing an application example of the parison supply device and parison supply method according to one embodiment of the invention.
Figure 4:
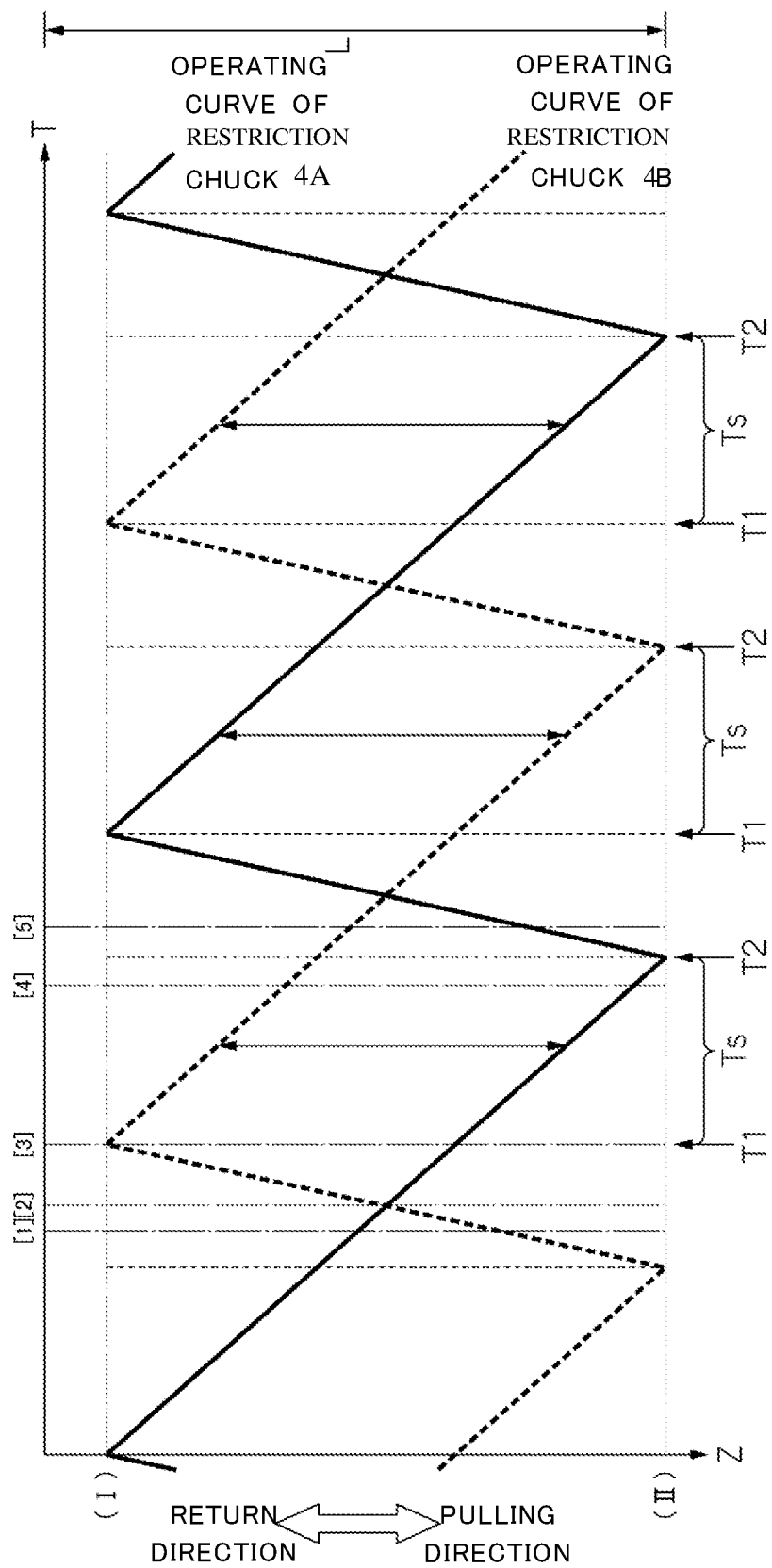
FIG. 4 is an explanatory view showing an application example of the parison supply device and parison supply method according to one embodiment of the invention.
Figure 5:
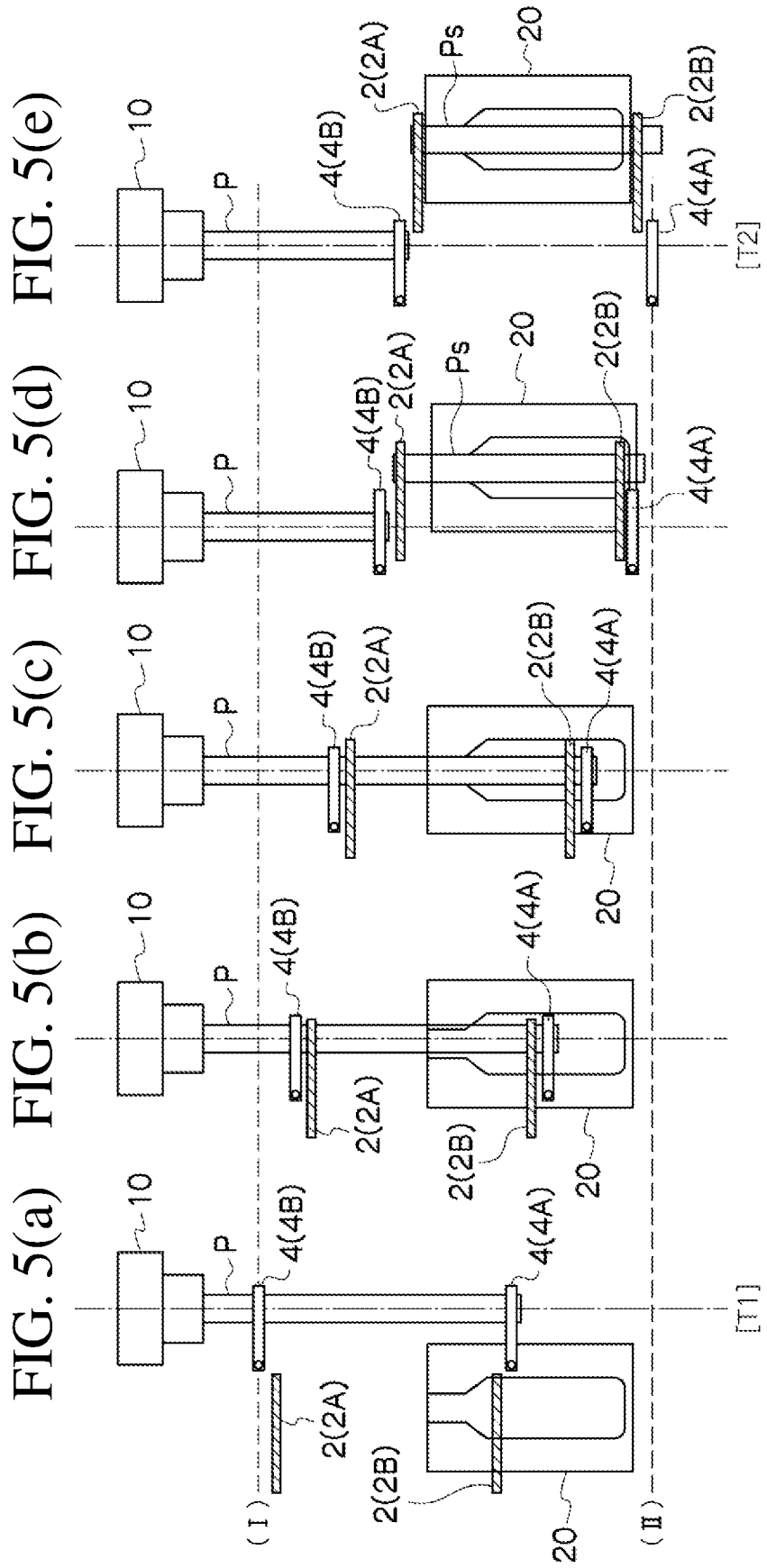
FIGS. 5(a)-5(e) are explanatory views showing an application example of the parison supply device and parison supply method according to one embodiment of the invention.

FIGS. 3 to 5 show an example in which the above-described pair of chucks 2 and chuck operation part 3 are incorporated into a mechanism that normally restricts a parison discharged from the extrusion die. As shown in FIG. 3, the parison supply device 1 according to this example includes a plurality of restriction chucks 4 and a restriction chuck operation part 5. The following description will be given on an example in which two restriction chucks 4A and 4B are included as the restriction chucks 4. However, the restriction chucks 4 included in one parison supply device 1 may be given three or more in quantity.

The restriction chucks 4A and 4B apply, to the gripped parison P, a pull in the same direction as a discharge direction of the parison P, against the extrusion die 10. An operational timing at which the restriction chucks 4A and 4B grip a parison P may be a time point simultaneous or after a start of movement in the discharge direction of the restriction chucks 4A and 4B. Increasing the moving speed of the restriction chucks 4A and 4B in the discharge direction of the parison P relative to the discharge speed of the parison P allows the parison P to be pulled against the extrusion die 10.

The restriction chuck operation part 5 for operating the plurality of restriction chucks 4 performs repeated operations of the individual restriction chucks 4A and 4B at a specified cycle period so that the parison P discharged from the extrusion die 10 is normally restricted, continuing in its pulled state. According to the restriction chuck operation part 5, the repeated operations involved include a step of gripping the parison by the individual restriction chucks 4A and 4B at a first position (I) close to the extrusion die 10, and a step of moving the parison P up to a second position (II) separate from the extrusion die 10. A set distance L in the figure refers to a maximum distance to which the restriction chucks 4A and 4B are enabled to be distant from an opening end of the extrusion die 10 in the parison discharge direction.

Downward movement of the restriction chucks 4A and 4B, as viewed in the figure, is a movement to fulfill an operation of restricting the parison P and imparting pulling force thereto. Meanwhile, upward movement of the restriction chucks 4A and 4B, as viewed in the figure, is a movement to fulfill a return operation of derestricting the parison P and preparing a next pulling operation. The moving speed of the restriction chucks 4A and 4B in the return operation may be set to a necessary speed in accordance with a timing of the next pulling operation, irrespective of the moving speed in the pulling direction.

The restriction chuck operation part 5 sets operation timings for the preceding restriction chuck 4A (4B) and its succeeding restriction chuck 4B (4A) so that before the preceding restriction chuck 4A is located at the second position (II) so as to be apart from the extrusion die 10 by the set distance L, the succeeding restriction chuck 4B grips the parison P at the first position (I).

Reference signs (a) to (e) in FIG. 3 denote changes in the discharge state of the parison P and operations of the restriction chucks 4A and 4B in time-series order.

In FIGS. 3(a) and 3(b), the restriction chuck 4A is moved in the pulling direction (discharge direction) while gripping the parison P, and the restriction chuck 4B is moved in a return direction opposite to the pulling direction while gripping no parison P.

Then, in FIG. 3(c), the preceding restriction chuck 4A is continuing the pulling state while the succeeding restriction chuck 4B grips the parison P at the first position (I).

Subsequent to the state of FIG. 3(c), the parison P comes to be gripped on both sides by the pair of restriction chucks 4A and 4B as shown in FIG. 3(d). In such a state in which the parison P is gripped on both sides by the restriction chucks 4A and 4B, the step of pinching the parison P by the above-described pair of chucks 2 is carried out, by which separation of the parison segment Ps is fulfilled.

FIG. 4 charts operating curves of the restriction chucks 4A and 4B shown in FIG. 3, where the horizontal axis represents time T, the vertical axis represents distance Z from the extrusion die 10, polygonal lines in solid line denote an operating curve of the restriction chuck 4A, and polygonal lines in broken line denote an operating curve of the restriction chuck 4B. In addition, states at times [1] to [5] in FIG. 4 correspond to the states of FIGS. 3(a) to 3(e), respectively.

Referring to FIG. 4, the restriction chucks 4A and 4B are moved at constant speeds in the pulling direction, where moving speeds in the return direction of the restriction chucks 4A and 4B are made higher than moving speeds in the pulling direction to set a timing for start of the pulling.

In this case, at the timing T1 that is earlier by a time period Ts than the timing T2 at which the distance between the preceding restriction chuck 4A (4B) and the extrusion die 10 reaches the set distance L at the second position (II), the succeeding restriction chuck 4B (4A), when being at the first position (I), grips the parison P. Then, both the preceding restriction chuck 4A (4B) and the succeeding restriction chuck 4B (4A) are moved while clipping the parison P.

In this case, the individual restriction chucks 4A and 4B operate in accordance with similar operating curves having a phase difference to each other, working to normally restrict the parison P and apply pulling force thereto. During the above-mentioned time period Ts, the preceding restriction chuck 4A (4B) and the succeeding restriction chuck 4B (4A) are moved so as to separate farther from the extrusion die 10 while both gripping the parison P. By setting the moving speed of the restriction chuck 4A (4B) in the pulling direction to a constant one, the distance between the preceding restriction chuck 4A (4B) and its succeeding restriction chuck 4B (4A) is maintained constant during the time period Ts.

As shown in FIG. 5, part or entirety of the above-mentioned time period Ts may be assigned to the step of pinching a parison by the pair of chucks 2 and the parison conveyance step of cutting the parison segment Ps from the parison P and conveying the parison segment Ps to the blow mold 20.

The pair of chucks 2 (upper chuck 2A and lower chuck 2B) perform the operation of pinching the parison P while being moved downward in synchronization with the restriction chucks 4A and 4B. In the example of FIG. 5, the pair of chucks 2 (upper chuck 2A and lower chuck 2B) gradually approach the parison P while lowering with a constant distance maintained therebetween (see FIGS. 5(a) and 5(b)), then pinches the parison P at a specified position, and cuts off the parison segment Ps therefrom and conveys the parison segment Ps to the blow mold 20 (see FIGS. 5(c) and 5(d)). Thereafter, the pair of chucks 2, while further lowering, goes gradually apart from a center axis of the parison P so as to be moved upward and downward, respectively, of the blow mold 20, supplying the parison segment Ps to the blow mold 20 (see FIGS. 5(d) and 5(e)).

In the example shown in FIGS. 3 to 5, a plurality of restriction chucks 4 (respective restriction chucks 4A and 4B) are operated alternately, by which the parison P discharged from the extrusion die 10 can be normally restricted so that a linear pull can be applied thereto, and moreover the parison P discharged vertically downward can be prevented from becoming nonuniform in thickness due to drawdown. Also, the parison segment Ps, to which a proper pull remaining constant in direction and speed can be applied, can be supplied to the blow mold 20 while held in the pulled state. Further, since the pair of chucks 2, while being moved downward, pinch the lowering parison P, there can be avoided a phenomenon that the outer surface of the parison and the inner surfaces of the chucks rub against each other or a phenomenon that accumulations of the parison are formed on the chucks immediately after the pinching of the parison by the chucks. As a result of this, it is achievable to supply high quality parison segments Ps successively to the blow mold 20.

Figure 6:
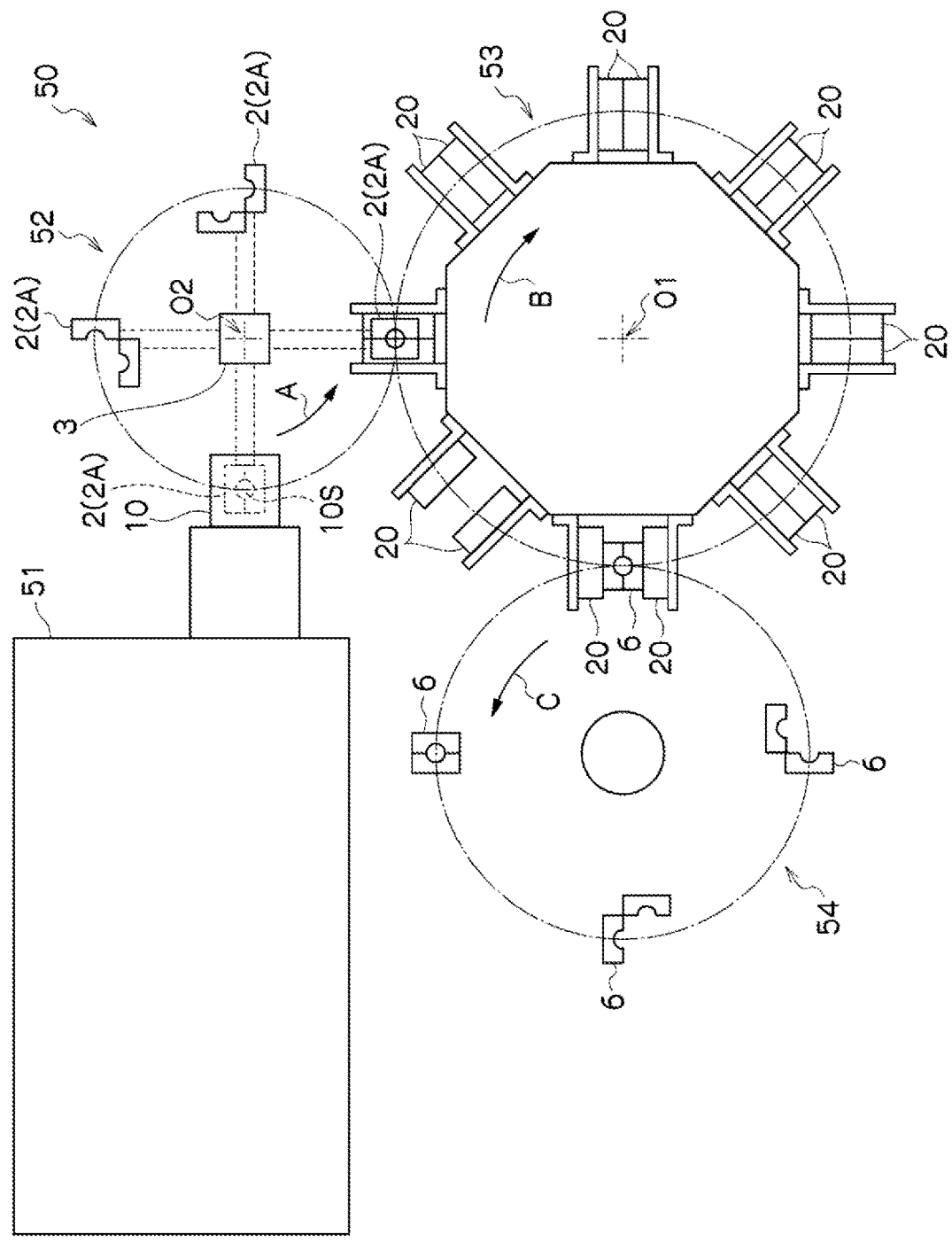
FIG. 6 is an explanatory view (top view) for explaining an example of a blow molding machine (horizontal rotary molding machine) using the parison supply device according to one embodiment of the invention.
Figure 7:
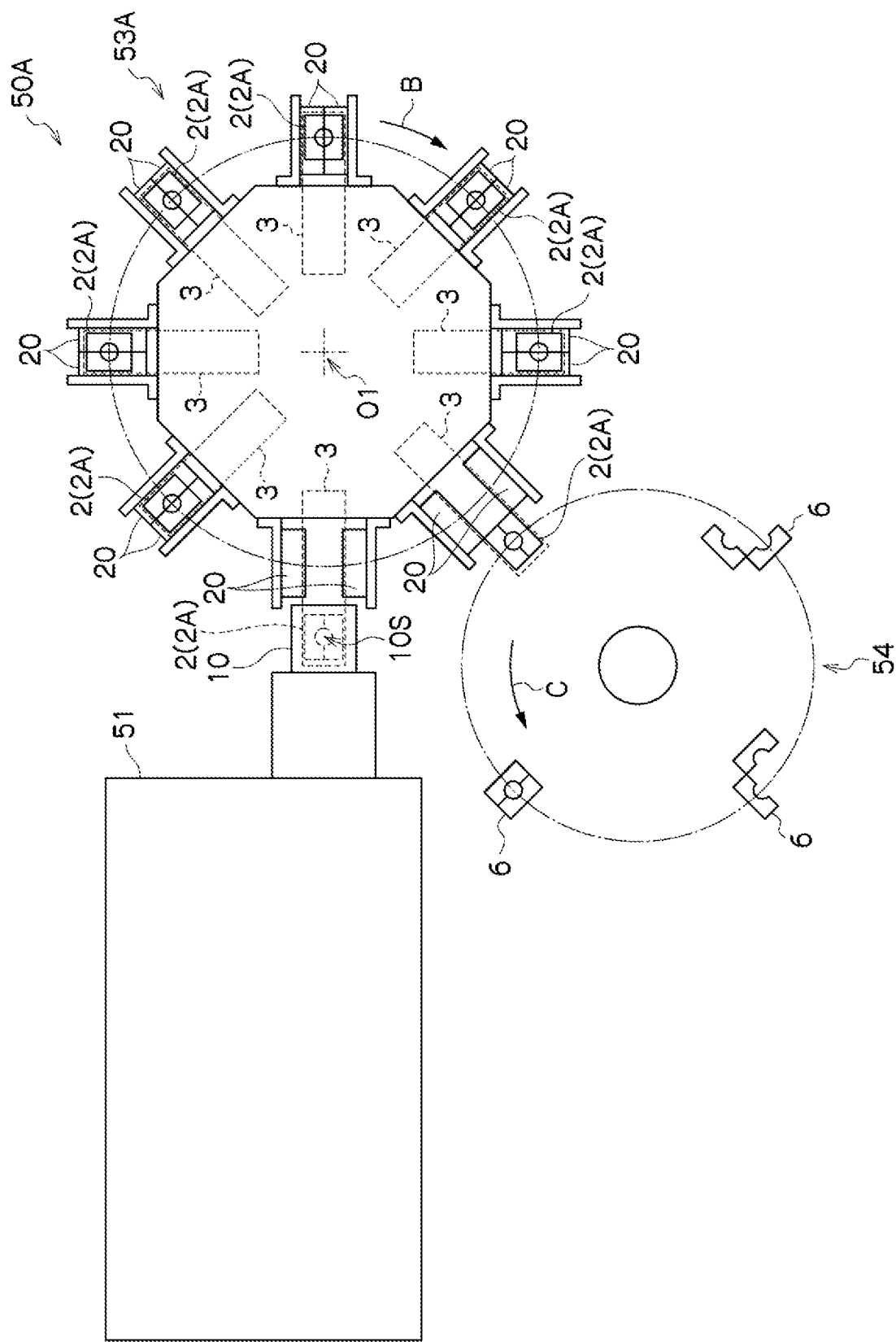
FIG. 7 is an explanatory view (top view) for explaining an example of a blow molding machine (horizontal rotary molding machine) using the parison supply device according to one embodiment of the invention.
Figure 8:
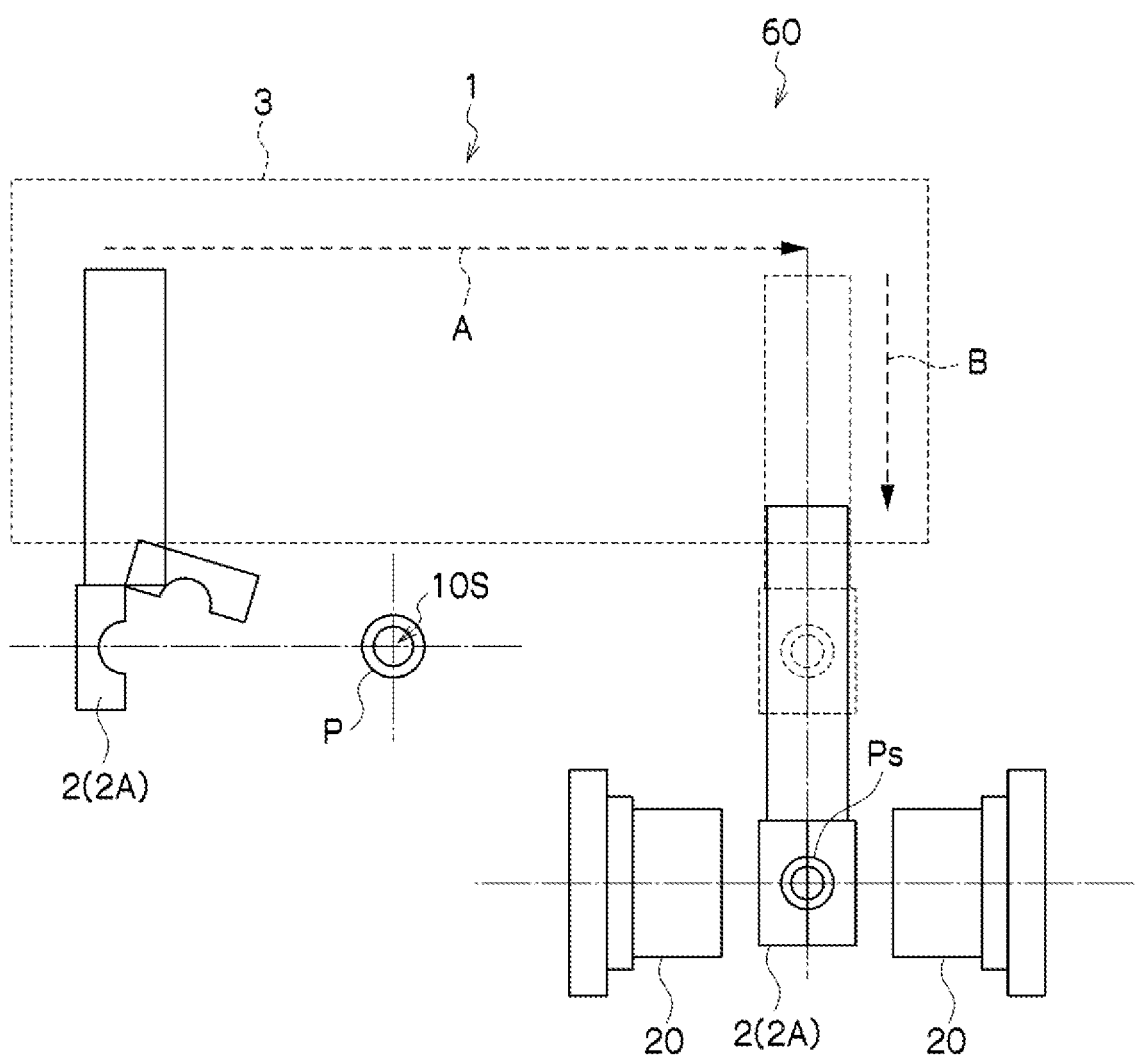
FIG. 8 is an explanatory view (top view) for explaining an example of a blow molding machine (shuttle molding machine) using the parison supply device according to one embodiment of the invention.
Figure 9:
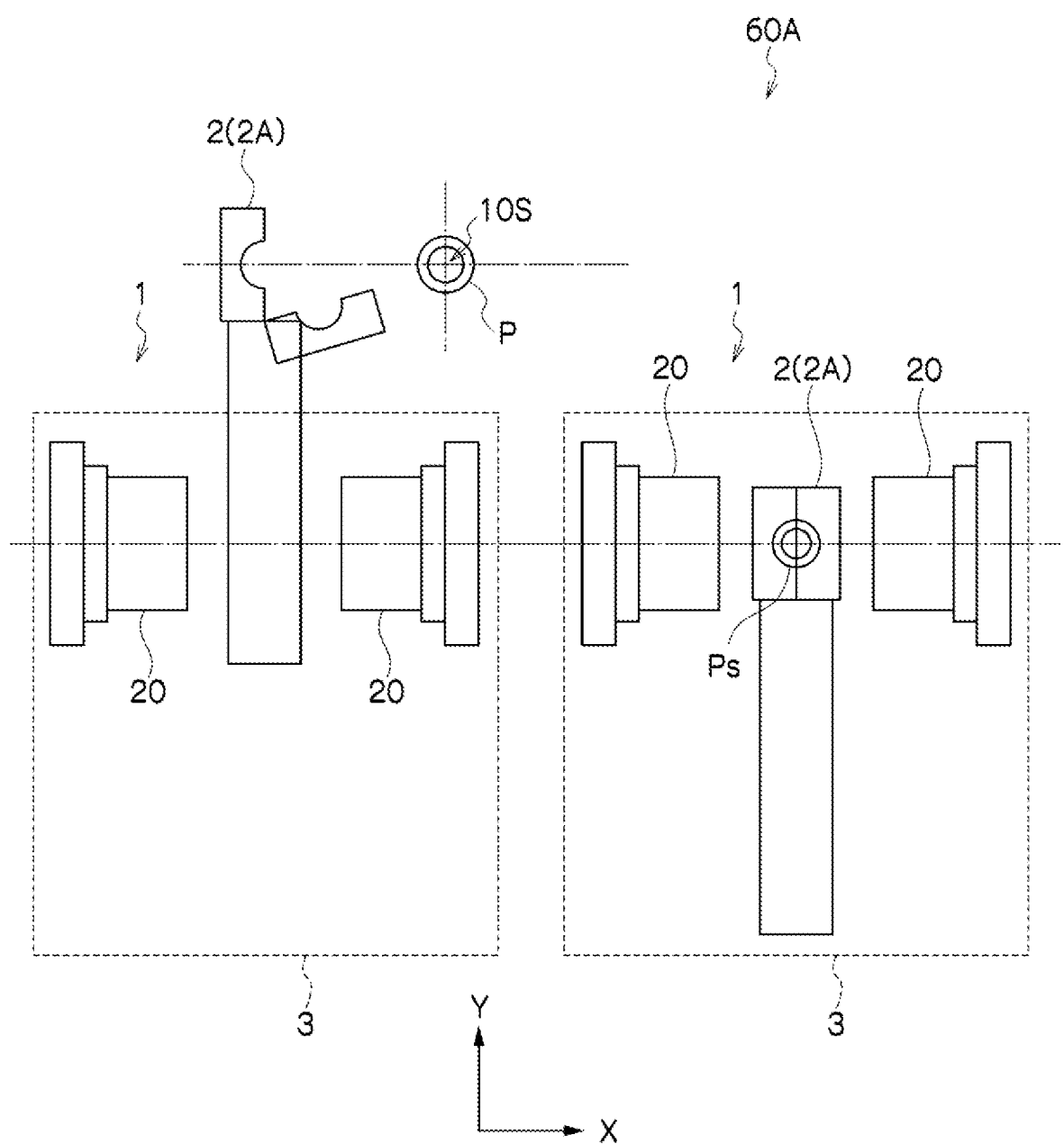
FIG. 9 is an explanatory view (top view) for explaining an example of a blow molding machine (shuttle molding machine) using the parison supply device according to one embodiment of the invention.

Examples of blow molding machines with use of the above-described parison supply device 1 will be described with reference to FIGS. 6 to 9. FIGS. 6 and 7 show examples of application to a horizontal rotary molding machine. FIGS. 8 and 9 show examples of application to a shuttle molding machine. All of those figures are top views each showing an outlined device configuration. In those figures, although only an upper chuck 2A in one pair of chucks 2 is depicted, a lower chuck 2B is disposed at a position overlapping with the upper chuck 2A.

Referring to FIG. 6, a blow molding machine 50 includes an extruder 51, a conveying turret 52, a molding turret 53, and an extraction turret 54. The extruder 51 is equipped with an extrusion die 10, so that a hollow parison is discharged vertically downward (in a direction perpendicular to the drawing sheet) and coaxially with a die center 10S of the extrusion die 10. The discharged parison is pinched by a pair of chucks 2 provided in the conveying turret 52, and a parison segment is conveyed in an arrow A direction so as to be supplied to one of plural blow molds 20 included in a molding turret 53 which is rotated horizontally about a vertical axis O1.

The conveying turret 52 is rotated horizontally about a vertical axis O2 other than the vertical axis O1 of the molding turret 53, so that pairs of chucks 2, which are disposed in plurality at positions equidistant from the vertical axis O2 are moved horizontally. Also, the conveying turret 52 is provided with the chuck operation part 3 so that the chuck operation part 3 makes a pair of chucks 2 perform the operation of pinching the parison while being moved downward during the course of approaching the die center 10S. The opening/closing operation of the pair of chucks 2 in the conveying turret 52 is controlled by the chuck operation part 3, so that the pair of chucks 2 are opened just before the die center 10S, closed at the die center 10S to pinch the parison, and then rotated as it is to supply the parison segment to the blow mold 20 of the molding turret 53, thereafter opened again.

The molding turret 53 is rotated horizontally about the vertical axis O1 in synchronization with the conveying turret 52 so that the blow molds 20 disposed in plurality at equidistant positions from the vertical axis O2 are moved horizontally. At a position of contact with a rotational locus of the pair of chucks 2 in the conveying turret 52, each blow mold 20 of the molding turret 53 is closed so as to pinch the parison segment supplied thereto, and then subjected to blow molding while being rotated in an arrow B direction. Then, after completion of the molding, the blow mold 20 is opened at a position of contact with an extraction chuck 6 of the extraction turret 54. The extraction turret 54 is rotated in an arrow C direction, so that the extraction chuck 6 pinches a molded product at a position of contact with the blow mold 20 and conveys the product in the arrow C direction.

Referring to FIG. 7, a blow molding machine 50A includes an extruder 51, a molding turret 53A, and an extraction turret 54. The extruder 51, as in the foregoing example, is equipped with an extrusion die 10, so that a hollow parison is discharged vertically downward (in a direction perpendicular to the drawing sheet) and coaxially with a die center 10S of the extrusion die 10.

The molding turret 53A is equipped with a plurality of blow molds 20, and a pair of chucks 2 are provided for each plural blow molds. Then, blow molds 20 which are moved horizontally by horizontal rotation about the vertical axis O1 of the molding turret 53A are disposed at positions successively opposed to the die center 10S of the extrusion die 10. In the molding turret 53A, chuck operation parts 3 are also provided for operating the pairs of chucks 2 provided for each plural blow molds 20.

In the blow molding machine 50A described above, a pair of chucks 2 in the position opposed to the die center 10S are moved to pinch a discharged parison and supply the parison segment into the opened blow mold 20. In this state, under the control of the chuck operation part 3, the pair of chucks 2 perform the operation of pinching the parison while being moved downward during the movement toward the die center 10S. When the parison segment has been supplied to the blow mold 20, the blow mold 20 is closed, followed by execution of blow molding while the blow mold 20 is moved horizontally in the arrow B direction. Then, after completion of the molding, the blow mold 20 is opened at a position of contact with the extraction chuck 6 of the extraction turret 54. The chuck operation part 3 makes the pair of chucks 2 so as to separate the molded product from the blow mold, delivering the molded product to the extraction chuck 6 of the extraction turret 54. The extraction turret 54 is rotated in the arrow C direction to convey the molded product, which is pinched by the extraction chuck 6, in the arrow C direction.

Referring to FIG. 8, a blow molding machine 60 includes a parison supply device 1 which is provided with a pair of chucks 2 and a chuck operation part 3, as well as a blow mold 20 which performs opening/closing operation at a stationary position, in which arrangement the pair of chucks 2 pinching the parison are moved to the stationary-positioned blow mold 20. In this blow molding machine 60, the chuck operation part 3 makes the pair of chucks 2 pinching the parison in both the arrow A direction and the arrow B direction, where a parison segment Ps pinched during the movement is supplied to the stationary-positioned blow mold 20. In this case, by the chuck operation part 3, the pair of chucks 2 are made to perform the operation of pinching the parison P while being moved downward during the movement in the arrow A direction.

Referring to FIG. 9, a blow molding machine 60A includes a parison supply device 1 which is provided with a pair of chucks 2 and a chuck operation part 3, as well as a blow mold 20 which is to be moved along with the parison supply device 1, in which arrangement a pair of chucks 2 are moved along with the blow mold 20 to pinch the parison P (parison segment Ps) and, in this state, moved upward and downward, respectively, of the blow mold 20. In this blow molding machine 60A, the parison supply device 1 is provided for each blow mold 20 that moves in parallel along an X direction. During the parallel movement of the blow mold 20, the chuck operation part 3 makes the pair of chucks 2 moved in a Y direction to pinch and convey a parison to the blow mold 20. Also in this case, during the movement in the Y direction by the chuck operation part 3, a pair of chucks 2 perform the operation of pinching the parison P while being moved downward.

In the examples shown in FIGS. 8 and 9, the chuck operation part 3 is enabled to perform an operation of moving the pair of chucks 2 so that the molded product is separated from the blow mold 20 after the molding. In the example of FIG. 8, moving the pair of chucks 2 in a direction opposite to the arrow B direction after molding allows the molded product to be separated from the blow mold 20. In the example of FIG. 9, moving the pair of chucks 2 in the Y direction after molding allows the molded product to be separated from the blow mold 20.

As has been described hereinabove, in the parison supply device, the parison supply method, the blow molding machine and the blow molding method according to the embodiment of the invention, with regard to a parison discharged downward from the extrusion die 10, in process of pinching the parison by the upper-and-lower pair of chucks 2 and subsequently moving the parison to the blow mold 20, a pair of chucks 2 perform the operation of pinching the parison while being moved downward. By virtue of this, there can be avoided a phenomenon that the outer surface of the parison and the inner surfaces of the chucks rub against each other or a phenomenon that accumulations of the parison are formed on the chucks immediately after the pinching of the parison by the pair of chucks 2. Thus, it is achievable to maintain the parison thickness distribution uniform and improve the repeatability of molding performance.

Also according to the embodiment of the invention, since the parison is pinched and conveyed to the blow mold 20 by the upper-and-lower pair of chucks 2, it is achievable to eliminate effects of swings of the parison and supply a quality parison to the blow mold. Since the upper-and-lower pair of chucks 2 can be positioned independently of each other by the chuck operation part 3, it is achievable, for molding of asymmetric bottles or other occasions, to supply a parison segment in an inclined or curved state in accordance with the configuration of the blow mold so that bottles of various configurations can be controlled in terms of thickness with high precision.

Also according to the embodiment of the invention, a vertically extruded parison can be pinched horizontally by the pair of chucks 2 and moved to the blow mold. By virtue of this, it is achievable to supply quality parisons with horizontal rotary molding machines or shuttle molding machines. Moreover, in the embodiment of the invention, by using a restriction chuck 4 for normally restricting the parison in combination with a mechanism for applying a pull thereto, it is achievable to supply more quality parison, so that blow molding with improved quality of molded products can be implemented.

Referring next to FIGS. 10 to 14, another embodiment of the invention will be described. This embodiment includes a parison cutting device 100 in which the above-described restriction chuck 4 is equipped with a cutter 101. The parison cutting device 100 is to cut, in supply units Ps for supply to the mold, a parison P discharged vertically downward from the extrusion die 10 of the extruder. The cutter 101 is to cut the parison just under the restriction chuck 4. The restriction chuck 4 and the cutter 101 can be formed into an integral structure, where a distance between a lower surface of the restriction chuck 4 and an upper surface of the cutter 101 is set to 10 mm or less, preferably 1 to 10 mm.

Figure 10A:
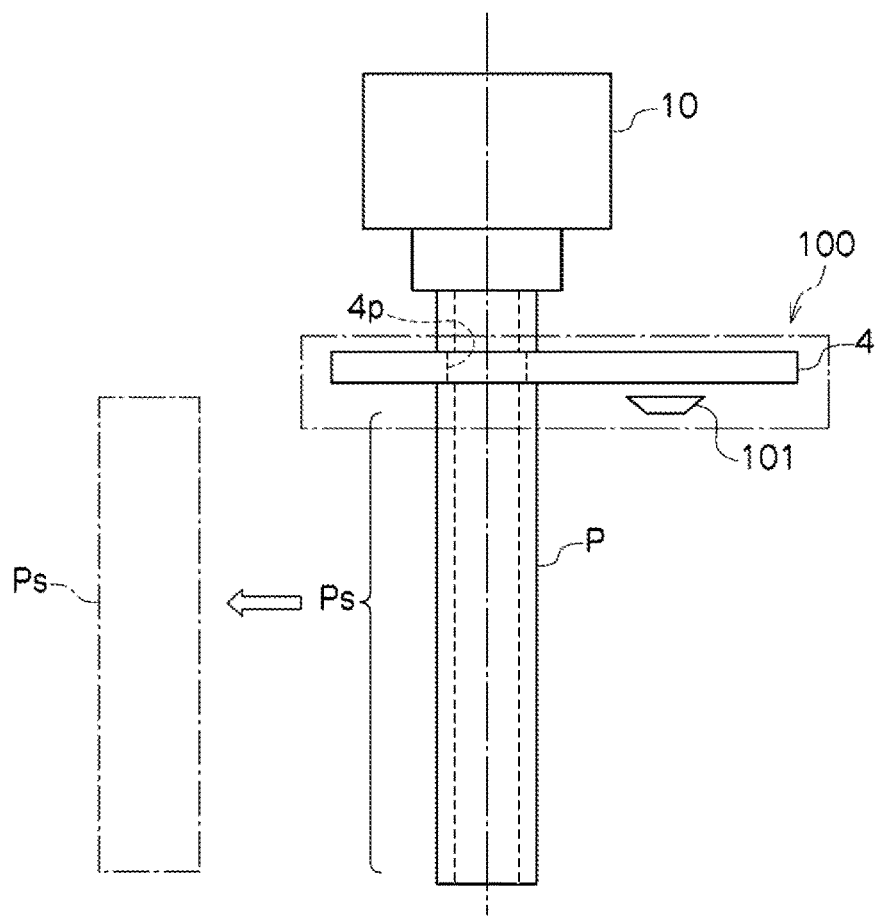
FIGS. 10(a) and 10(b) for explaining a parison cutting device (where FIG. 10(a) is an explanatory view in a side view and FIG. 10(b) is an example in a plan view)
Figure 10B:
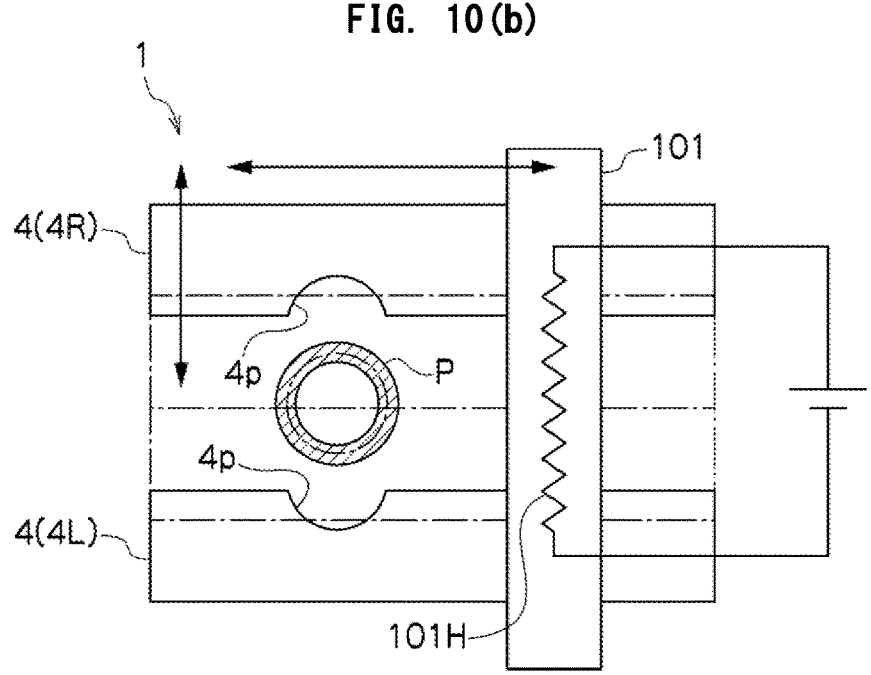
Figure 11D:
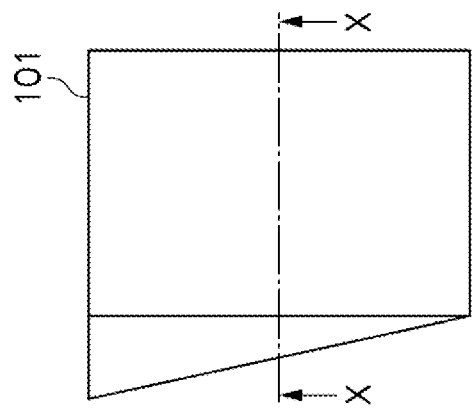
FIGS. 11(a)-11(d) are explanatory views (plan views and X-X sectional views) showing forms of cutters provided in the parison cutting device.
Figure 11C:
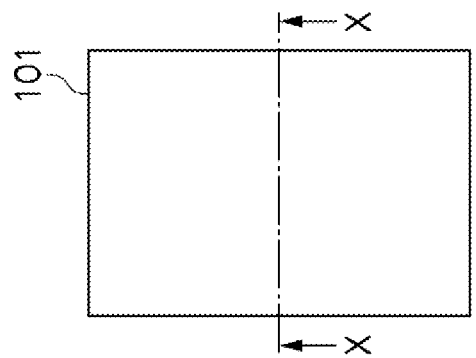
Figure 11B:
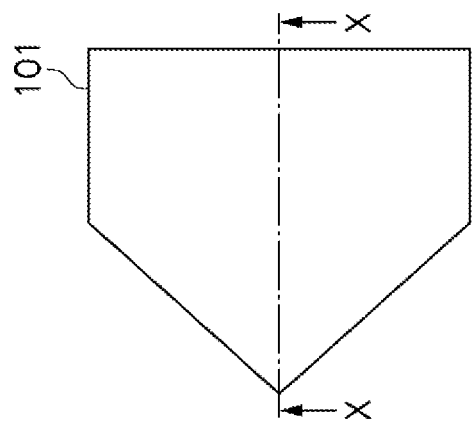
Figure 11A:

A pair of chuck pieces 4R and 4L in the restriction chuck 4 each have a semicircular-shaped recessed part 4p for maintaining a hollow state of the parison, as shown in FIGS. 10(*a*) and 10(*b*). By virtue of their having such a recessed part 4p, the parison P, while maintaining an air-permeable state inside, is gripped only at its peripheral part by the restriction chuck 4. As shown in FIG. 10(*b*), the restriction chuck 4 has a pair of chuck pieces 4R and 4L that are moved closer to and farther from each other along uniaxial direction within a horizontal plane, and the cutter 101 is moved in a direction perpendicular to the uniaxial direction to cut the parison P. The cutter 101, which permits a heater 101H to be installed inside as required, can be set to a proper cutter temperature (e.g., 400 to 600° C.) in accordance with an object resin of the parison P.

The cutter 101 may be set, as required, into such forms as band shape (a), platy arrowhead type (b), platy flat type (c), platy guillotine type (d) and the like, as shown in FIG. 11. The material of the cutter 101 may be selected as required, where SUS, Ni alloys or the like, which less cause deformation in heating process, may be used when heating of the cutter 101 is involved. Also, edging of the cutter 101 may be provided only on one side so as to allow cutting to be done by unidirectional movement or provided on both sides so as to allow cutting to be done alternately by reciprocative movement.

According to such a parison cutting device 100 as described above, since the parison P is gripped by the restriction chuck 4 and cut beneath the gripped part by the cutter 101, a secure cutting and segmentation can be fulfilled so that a quality cutting face can be obtained. Further, the pair of chuck pieces 4R and 4L of the restriction chuck 4, each having a recessed part 4p to form a hole part concentric with the parison center, is enabled to grip only the peripheral part of the parison P, so that the cutting operation is carried out with a positive pressure maintained within the parison P, making it possible to prevent crush (closure) of the cutting face.

Figure 12:
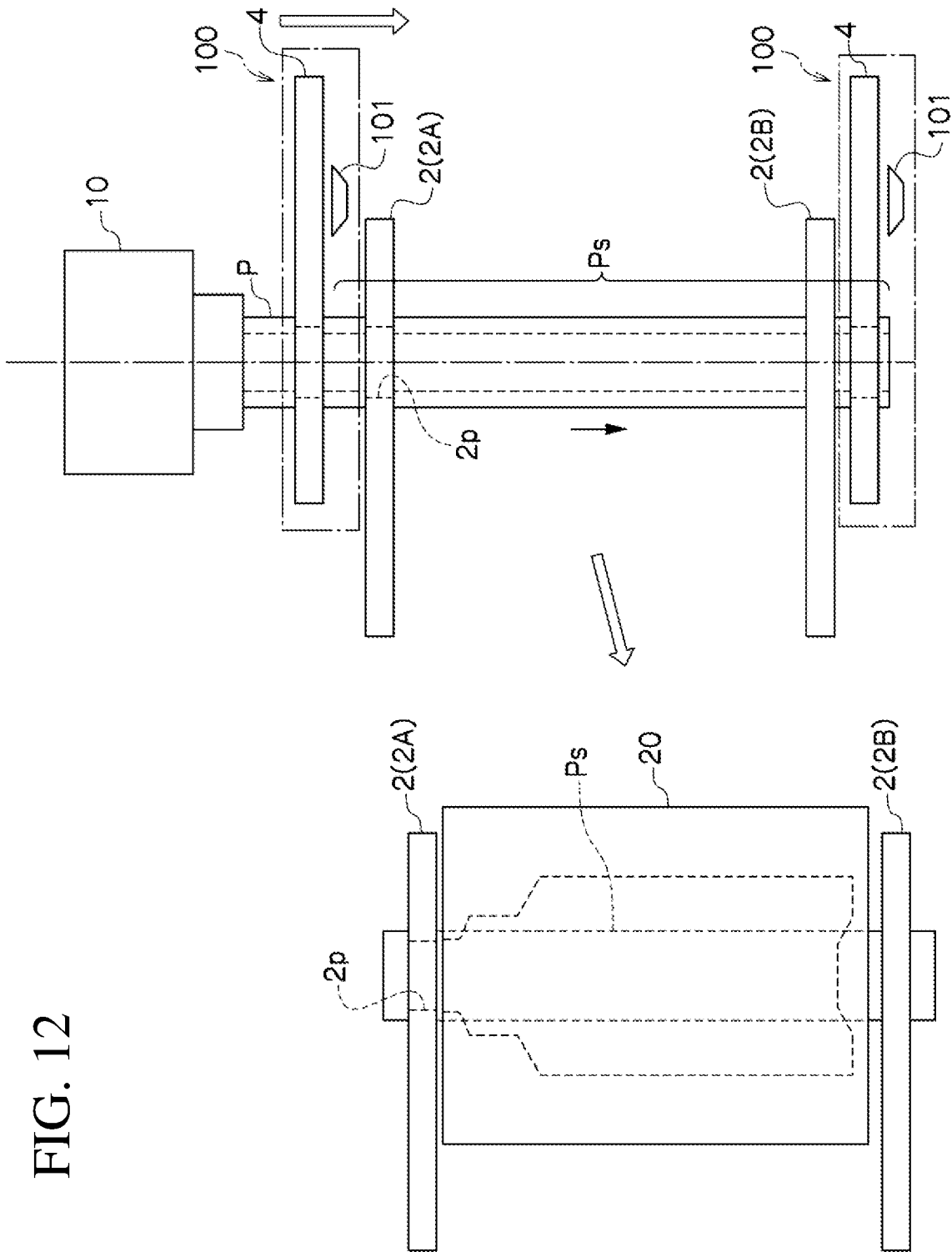
FIG. 12 is an explanatory view showing an operation example of the parison cutting device.

FIG. 12 shows an operation example of the parison cutting device 100. The parison cutting device 100, gripping the parison P, performs cutting operation while being moved downward. The restriction chuck 4, while gripping the peripheral part of the parison P and being moved downward, restricts the parison P discharged from the extrusion die 10, and the cutter 101, while being moved integrally with the restriction chuck 4, cuts the parison P beneath the restriction chuck 4.

As described above, since the parison cutting device 100, while gripping the parison P and being moved downward, performs cutting operation, an operation of moving the extrusion die 10 upward relative to parisons P discharged successively from the extrusion die 10 can be omitted, so that the parison P can securely be cut and segmented while avoiding recombination after the cutting. In this case, the cutter 101 performs the cutting operation after the restriction chuck 4 has gripped the parison P and the pair of chucks 2 moved downward in accordance with motion of the parison cutting device 100 under the cutter 101 has held the supply-unit Ps of the parison P. The pair of chucks 2 are moved horizontally while being moved downward, so that the parison segment Ps after the cutting is withdrawn just under the extrusion die 10.

The chucks 2 include an upper chuck 2A which is composed of a right-and-left pair of chuck pieces for pinching an upper part of the supply unit Ps on the lower side of the cutter 101, and a lower chuck 2B which is composed of right-and-left pair of chuck pieces for pinching a lower part of the supply unit Ps. In this case, a distance between the lower surface of the cutter 101 and the upper surface of the upper chuck 2A is preferably set to about 5 to 15 mm. A distance between the upper chuck 2A and the lower chuck 2B is set in accordance with the height of the blow mold 20, to which the parison segment Ps is to be supplied, in such fashion that the parison segment Ps can be held at upper-and-lower outer sides of the blow mold 20. Then, the pair of chuck pieces of the upper chuck 2A each have a semicircular-shaped recessed part 2p to form a hole part concentric with the parison center. With this recessed part 2p provided, it is achievable to supply the parison segment Ps to the blow mold 20 while the cutting face of the parison is maintained open.

Figure 13A:
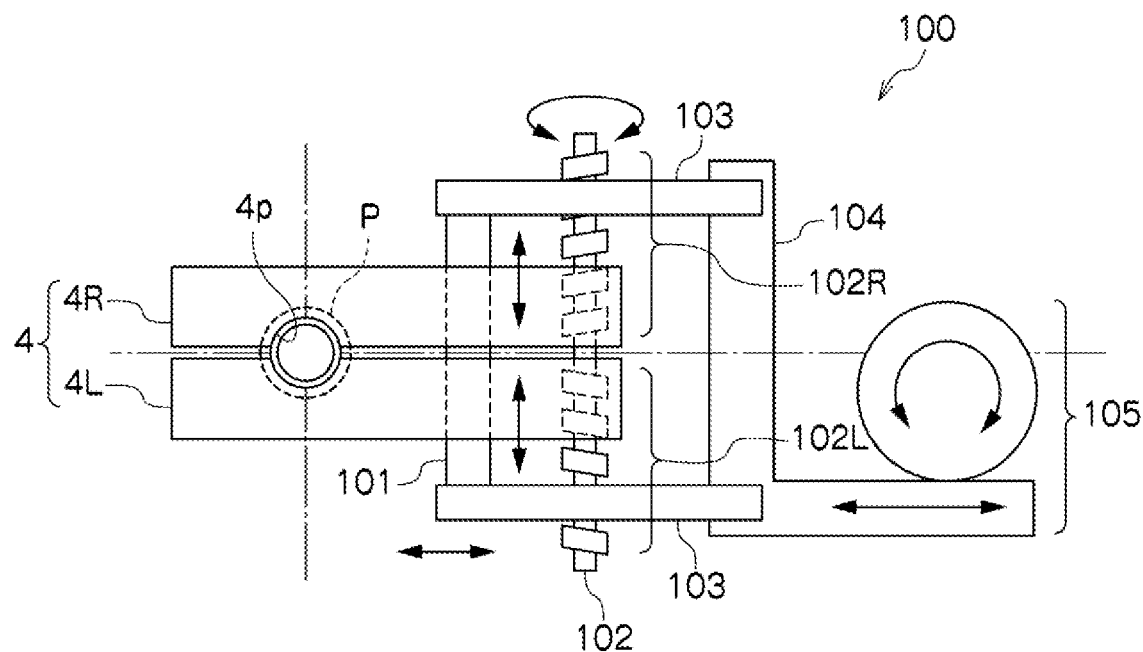
FIGS. 13(a) and 13(b) are explanatory views showing an example of a gripping-and-cutting operation mechanism in the parison cutting device (where FIG. 13(a) is an example of a rack-and-pinion mechanism and FIG. 13(b) is an example of a crank mechanism)
Figure 13B:
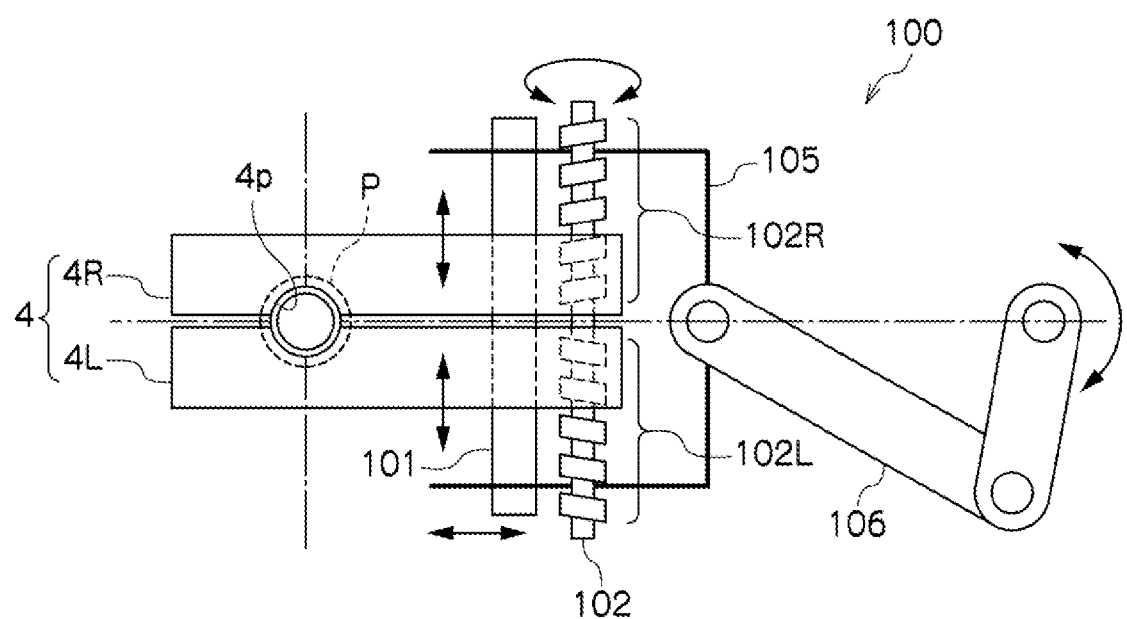

FIG. 13 shows an example of a gripping-and-cutting operation mechanism in the parison cutting device 100. The right-and-left pair of chuck pieces 4R and 4L of the restriction chuck 4 included in the parison cutting device 100 can be driven so as to go closer to and farther from each other along a uniaxial direction within a horizontal plane by a lead screw 102, for example, as shown in FIGS. 13(a) and 13(b). The lead screw 102 is provided with screw parts 102R and 102L whose lead directions are opposite to each other.

The cutter 101 included in the parison cutting device 100 is, in the example of FIG. 13(a), supported by a support frame 103 fitted to an operation frame 104, where the operation frame 104 is reciprocated by a rack-and-pinion mechanism 105 in a direction perpendicular to the direction in which the pair of chuck pieces 4R and 4L are moved closer to and farther from each other. In the example of FIG. 13(b), an operation frame 104 that supports the cutter 101 is reciprocated by a crank mechanism 106 in a direction perpendicular to the direction in which the pair of chuck pieces 4R and 4L are moved closer to and farther from each other. These mechanism examples are only examples and various operation mechanisms may be adopted.

The parison cutting device 100 including the restriction chuck 4, as shown in FIG. 14, can be operated in the same manner as in FIG. 3. By moving the restriction chuck 4 (4A and 4B) downward, the parison cutting device 100 can normally restrict the parison P discharged from the extrusion die 10 to apply a linear pull thereto. As a result, the parison P discharged vertically downward can be prevented from becoming nonuniform in thickness due to drawdown, so that with application of a proper pull whose direction and speed remain unchanged, the parison P can be cut by the cutter 101 while the pulled state is being held. As a result, high quality parison P high in thickness uniformity and excellent in molecular orientation state or the like can be cut off and supplied to the blow mold 20.

Then, the downward-moving restriction chuck 4 (4A and 4B) grips the peripheral part of the parison, and the pair of chucks 2 hold the supply unit Ps of the parison P under the restriction chuck 4. Thereafter, the parison P is cut by the cutter 101 that moves integrally with the restriction chuck 4 just under the restriction chuck 4. As a result, the parison P can securely be cut and segmented, and moreover the parison segment can be supplied to the blow mold 20 while the cutting face of the parison is maintained open as it is.

Thus, the operation of moving the extrusion die 10 (extruder) upward can be omitted, and moreover the blow mold 20 is enabled to fulfill a blow step of high exhaust-and-cooling efficiency by inserting a blow nozzle or a blow pin through an upper opening of the clipped parison. As a result of this, the molding cycle can be raised so that a high productivity of molded products can be obtained. Also, since the step of sticking a blow needle into the parison within the mold can be omitted, there can be eliminated generation of needle rubbish so that high quality molded products can be obtained.

Next, another embodiment of the invention will be described with reference to FIGS. 15 to 18. As shown in FIG. 15, a blow molding machine 70 includes a pair of chucks 2 (one chuck (upper chuck) 2U and the other chuck (lower chuck) 2D), a blow mold 20, a blow device 7, and an extraction device 8 (one extraction part 8U and the other extraction part 8D).

Figure 16A:
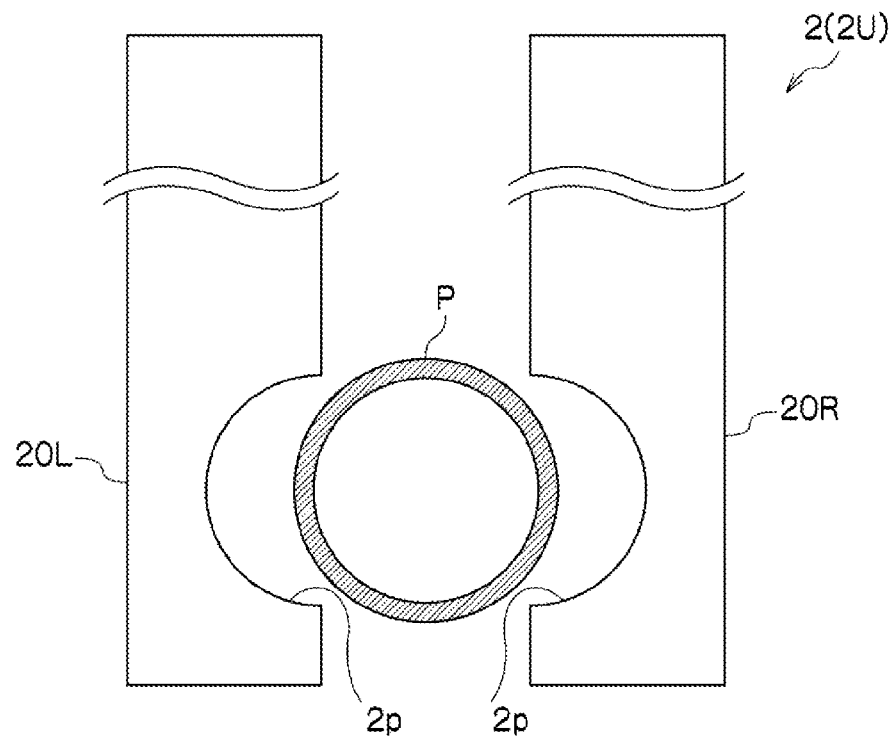
FIGS. 16(a) and 16(b) are explanatory views showing chucks according to an embodiment of the invention (where FIG. 16(a) shows one chuck and FIG. 16(b) shows the other chuck)

The pair of chucks 2 are composed of one chuck 2U for gripping an upper part of the parison P, and the other chuck 2D for gripping a lower part of the parison P. The one chuck 2U has an opening part 2a which allows the parison P to be gripped without closing its one-side opening. A configurational example thereof is shown in FIG. 16. As shown in FIG. 16(a), the one chuck 2U of the pair of chucks 2 pinches and grips the parison P by a right-side chuck piece 20R and a left-side chuck piece 20L, where coupling together recessed parts 2p provided in the right-side chuck piece 20R and the left-side chuck piece 20L, respectively, forms the above-described opening part 2a. In the example of the figure, the one chuck 2U is the upper-side chuck.

Figure 16B:
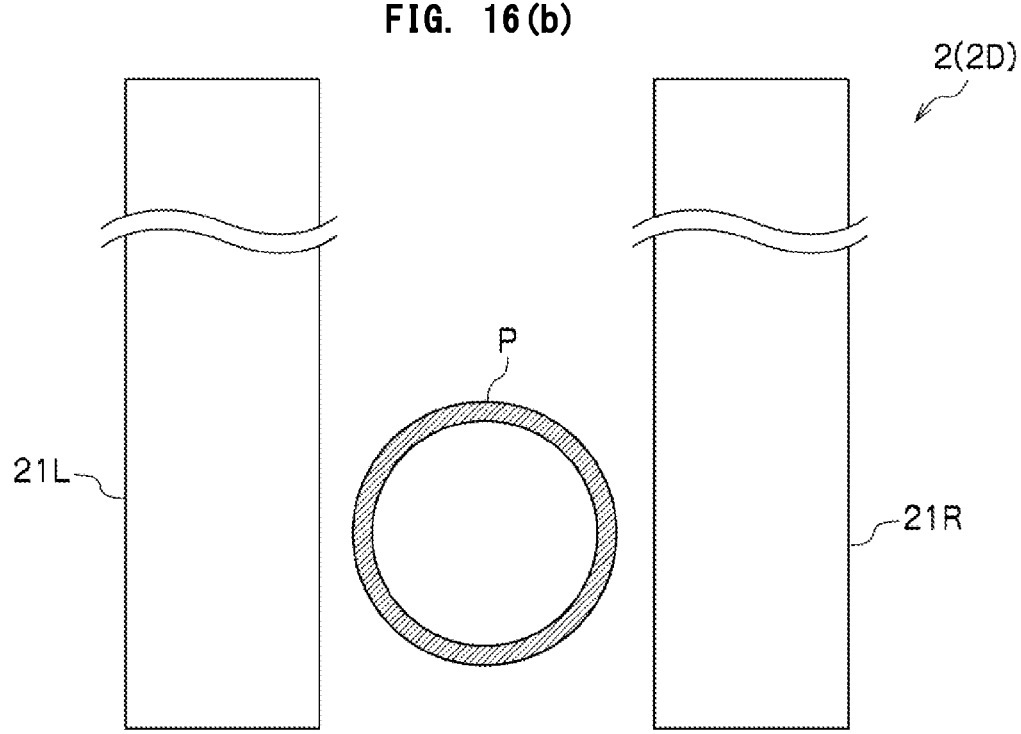

Also as shown in FIG. 16(b), the other chuck 2D in the pair of chucks 2, as in the one chuck 2U, pinches and grips the parison P by a right-side chuck piece 21R and a left-side chuck piece 21L. In the example of the figure, the other chuck 2D is the lower-side chuck. The pair of chucks 2 (one chuck 2U and the other chuck 2D) perform gripping operation and conveying operation by chuck operation parts 22U and 22D, respectively.

Between the pair of chucks 2, the blow mold 20 clips the parison P gripped by the pair of chucks 2 (one chuck 2U and the other chuck 2D). Even after the clipping of the parison P by the blow mold 20, the gripping of the parison P by the pair of chucks 2 is continued.

The blow device 7 includes a blow nozzle 40 which is to be inserted into the parison P clipped by the blow mold 20 via the other chuck 2D of the pair of chucks 2. Since the one chuck 2U, having the opening part 2a that allows the parison P to be gripped without closing the one-side opening of the parison P, the blow nozzle 40 is inserted into the opening part 2a. The blow nozzle 40, by being inserted into the blow mold 20 through the opening part 2a of the one chuck 2U, is securely inserted into the parison P clipped by the blow mold 20.

The extraction device 8 includes one extraction part 8U and the other extraction part 8D for receiving, from a pair of chucks 2, a molded product M gripped by the pair of chucks 2 after mold opening of the blow mold 20.

Figure 15A:
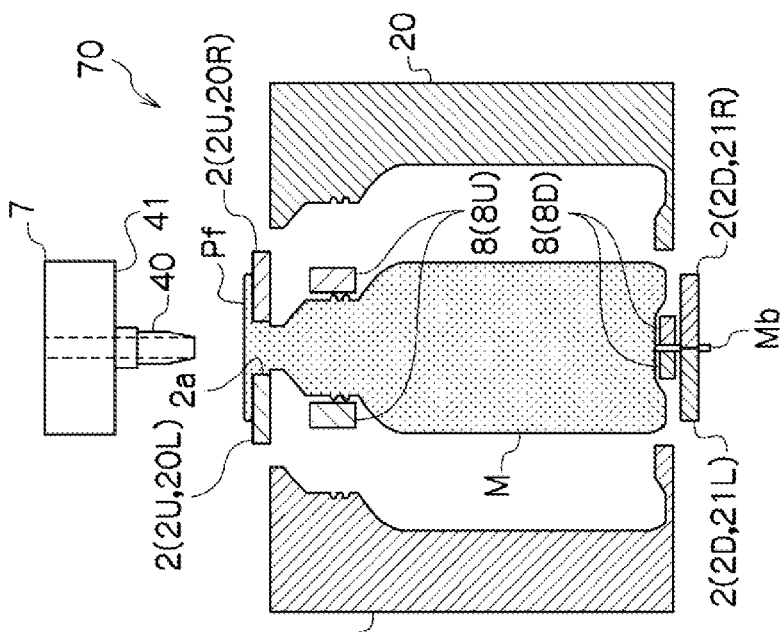
FIGS. 15(a)-15(c) are explanatory views showing a blow molding machine and blow molding method (where FIG. 15(a) shows a clamping step, FIG. 15(b) shows a blow nozzle insertion step and blow step, and FIG. 15(c) shows an exhaust step and extraction step)

Steps of a blow molding method by using the blow molding machine 70 as described above will be described. Each of parisons P discharged successively from an unshown extrusion die is gripped by the pair of chucks 2 and cut off by a length corresponding to the blow mold 20. As shown in FIG. 15(a), the parison P gripped at its upper part and lower part by the pair of chucks 2 is clipped at between pair of chucks 2 by the blow mold 20 (clamping step). The parison P, gripped at its upper part and lower part by the pair of chucks 2, is positioned to a specified position in the blow mold 20 with high precision.

Figure 15B:
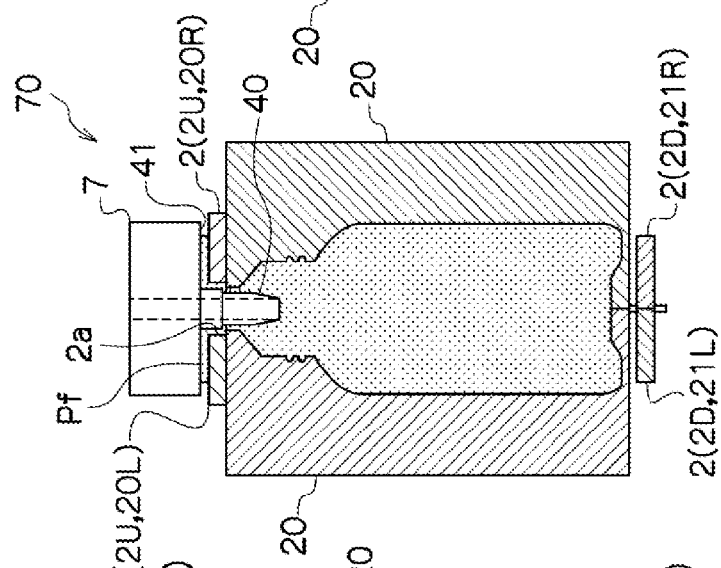

Next, as shown in FIG. 15(b), the blow nozzle 40 of the blow device 7 is inserted into the parison P clipped by the blow mold 20 via the one chuck 2U of the pair of chucks 2 (blow nozzle insertion step). While the parison P is maintained gripped by the pair of chucks 2, within a blow air is blown into the parison P within the blow mold 20 through the blow nozzle 40 (blow step).

Figure 15C:
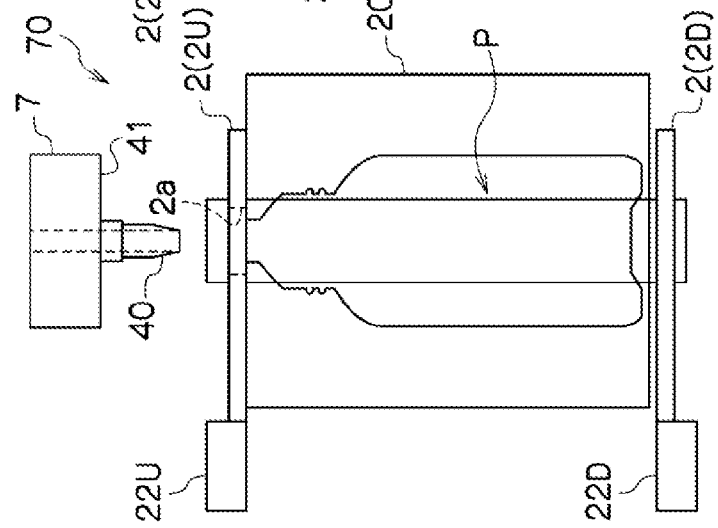

Thereafter, as shown in FIG. 15(c), the blow nozzle 40 is drawn out from the blow mold 20, and the blow mold 20 is exhausted (exhaust step). After opening of the blow mold 20, a molded product M gripped by the pair of chucks 2 is delivered from the pair of chucks 2 to the extraction device 8 (extraction step).

According to the blow molding method with use of the blow molding machine 70 as described above, during the course from the clamping step via the blow step to the extraction step subsequent to the mold opening, the parison P, or the molded product M, is normally gripped by the upper-and-lower pair of chucks 2. By virtue of this, the parison P can be positioned to the blow mold 20 with high precision, and moreover the molded product can be held in a stable state during the mold opening so that a successful handling of the molded product M can be achieved during the extraction from the blow mold 20 as well as in the subsequent steps.

Via the one chuck 2U that grips the parison P without closing its one opening, the blow nozzle 40 is inserted into the parison P clipped by the blow mold 20. Therefore, the blow nozzle 40 can securely be inserted into the parison P clipped by the blow mold 20, so that a blow process of high precision can be carried out.

Then, the blow molding machine 70 includes, as a further characteristic component, a stretch-forming unit for stretch forming part of the parison P along the one chuck 2U. In the example shown in FIG. 15, the blow device 7 includes, as the stretch-form unit, a stretch-forming part 41 for clipping and press forming part of the parison P against the upper surface of the one chuck 2U.

With the blow device 7 including the stretch-forming part 41, as shown in FIG. 15(b), in the blow nozzle insertion step, part of the parison P is press formed between the upper surface of the one chuck 2U and the stretch-forming part 41 of the blow device 7, by which a flange-shaped stretched part Pf is formed. By forming such a stretched part Pf, as shown in FIG. 15(c), the molded product M after the mold opening can be held in a stable state by the pair of chucks 2, so that the molded product M can securely be delivered to the extraction device 8.

A concrete example of the above-described exhaust step for exhausting the blow mold 20 with the blow nozzle 40 drawn out from the blow mold 20 will now be described. In these examples, the blow nozzle 40 is drawn out from the blow mold 20 immediately after completion of the blow step, thus allowing exhaust of the blow mold 20 to be implemented by releasing air within the molded product such as a bottle without intervention of a solenoid valve or other valve. Therefore, exhaust of the blow mold 20 subsequent to the blow step can promptly be carried out, allowing high efficiency of the molding cycle to be achieved by reduction of the exhaust time. In this case, an example of bottle molding will be described.

In a first concrete example, which has a simplified basic configuration of the example, after an air supply-side valve is opened to enhance the pressure in the blow mold 20, an exhaust-side valve is opened to allow air to be circulated in the blow mold 20, by which the bottle is cooled from inside.

In a second concrete example, with the blow nozzle 40 provided in a double circular-tube structure, after an air supply-side valve is opened to enhance the pressure in the blow mold 20 due to air supply from a central nozzle, an exhaust-side valve is opened to allow air to be circulated in the blow mold 20 via a flow passage formed by the central nozzle 112 and an outer-peripheral nozzle, by which the bottle is cooled from inside. Like this, the blow nozzle 40 is provided in a double circular-tube structure, by which air is circulated with high efficiency, allowing the cooling time to be shortened.

In a third concrete example, the central nozzle constituting the double circular-tube structure of the blow nozzle 40 is provided by an up/down movable rod, thereby making it possible to implement the cooling of bottom part of the bottle by a tip end of the rod as well as the cooling of such relevant sites of the bottle as barrel part and mouth part by a lateral hole of the rod. In these concrete examples, as described before, the blow nozzle 40 is drawn out from the blow mold 20, by which exhaust is promptly carried out.

Figure 17:
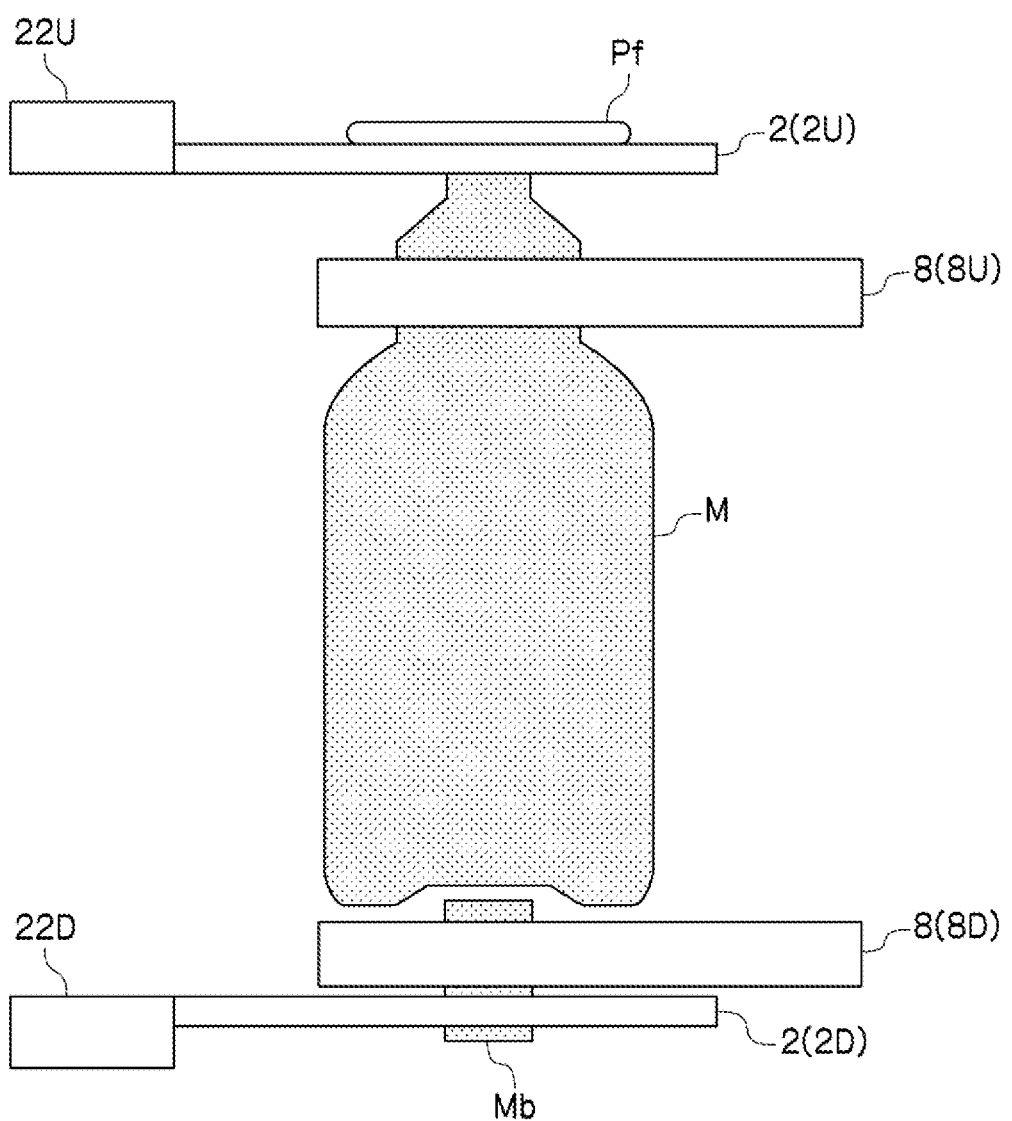
FIG. 17 is an explanatory view showing a concrete example of the extraction step in the blow molding method.

FIG. 17 shows a concrete example of the extraction step by the extraction device 8 (component members common to those of the foregoing description are designated by the same reference signs and their overlapping description is omitted). In the extraction step, the one chuck 2U grips one part under the flange-shaped stretched part Pf formed in upper part of the molded product M while the other chuck 2D grips a burr Mb formed on the other part of the molded product M. In this case, the one extraction part 8U of the extraction device 8 receives the molded product M gripped by the one chuck 2U while the other extraction part 8D of the extraction device 8 receives the burr Mb gripped by the other chuck 2D of the pair of chucks 2. Thus, the extraction device 8 receives not only the molded product M but also the burr Mb, so that elimination and collection of the burr Mb derived from the molded product M can be implemented securely and simply.

FIG. 18 shows another configurational example of the blow molding machine 70 (component members common to those of the foregoing description are designated by the same reference signs and their overlapping description is omitted). In this example, the above-described stretch-forming unit is included in the blow mold 20. That is, the blow mold 20 includes, as a stretch-forming unit, a stretch-forming part 30 for blow molding of part of the parison P against the lower surface of the one chuck 2U.

In this example, as described before, in the blow nozzle insertion step, part of the parison P is press formed between the upper surface of the one chuck 2U and the stretch-forming part 41 of the blow device 7, by which a flange-shaped stretched part Pf is formed. Then, in the blow step, part of the parison P is blow molded between the lower surface of the one chuck 2U and the stretch-forming part 30 of the blow mold 20, by which a flange-shaped stretched part Pf1 is molded. Since the stretched part Pf1 is molded along the lower surface of the one chuck 2U as in this case, the one chuck 2U is enabled to hold the molded product M even more stably. In this case, an example in which both stretched parts Pf, Pf1 are molded has been shown, but it is also allowable to omit the stretch-forming part 41 of the blow device 7 and mold only the stretched part Pf1.

According to the blow molding machine 70 or the blow molding method using the blow molding machine 70, a successful handling of the molded product M can be achieved in its extraction from the blow mold 20 as well as its subsequent steps. Also, elimination and collection of the burr Mb derived from the molded product M can be implemented securely and simply. Furthermore, a blow process of high precision can be carried out by securely inserting the blow nozzle 40 into the parison P clipped by the blow mold 20.

Although embodiments of the present invention have been described in detail hereinabove with reference to the accompanying drawings, yet its specific configuration is not limited to those embodiments and various changes, and design changes or the like should be construed as included therein unless they depart from the gist of the invention. Moreover, the above-described individual embodiments may be combined with one another by combinational use of their respective techniques unless those combinations have any particular contradictions or problems in terms of purposes, configurations and the like.

1 parison supply device,
2 chuck
2A upper chuck,
2B lower chuck
2U one chuck,
2D the other chuck
20R, 21R right-side chuck piece,
20L, 21L left-side chuck piece
22U and 22D chuck operation part,
2a opening part,
2p recessed part
3 chuck operation part,
4 (4A and 4B) restriction chuck,
4p recessed part
4R and 4L chuck piece
5 restriction chuck operation part,
6 extraction chuck
7 blow device,
8 extraction device
8U one extraction part,
8D the other extraction part
10 extrusion die,
10S die center,
20, 20A blow mold
30 stretch-forming part
40 blow nozzle,
41 stretch-forming part,
42 central nozzle
42a rod,
43 outer-peripheral nozzle
50, 50A, 60, 60A, 70 blow molding machine
51 extruder,
52 conveying turret,
53, 53A molding turret
54 extraction turret
100 parison cutting device,
101 cutter,
102 lead screw
102R and 102L screw part,
103 support frame,
104 operation frame
105 rack-and-pinion mechanism,
106 crank mechanism
P parison,
Ps parison segment (supply unit),
pf, pf1 stretched part
M molded product,
Mb burr

What is claimed is:

1. A parison supply device for supplying a parison discharged from an extrusion die to a blow mold, comprising: a pair of vertically movable chucks for pinching, from above and below, a parison discharged downward from the extrusion die, and for moving the parison to the blow mold; and a chuck operation part for controlling an operation of pinching the parison by the pair of vertically movable chucks and an operation of moving the pair of vertically movable chucks, wherein by the chuck operation part, the pair of vertically movable chucks perform the operation of pinching the parison while being moved downward, and one chuck out of the pair of vertically movable chucks includes an opening part which allows the parison to be gripped without closing a one-side opening of the parison, and a blow nozzle is inserted into the opening part.

2. The parison supply device according to claim 1, wherein the chuck operation part makes the pair of vertically movable chucks moved downward in accordance with a lowering speed of the parison.

3. The parison supply device according to claim 1, wherein the chuck operation part makes the pair of vertically movable chucks, which have pinched the parison, moved upward and downward, respectively, of the blow mold.

4. The parison supply device according to claim 3, wherein the chuck operation part makes the pair of vertically movable chucks, which have pinched the parison, moved in an up/down direction or in a direction crossing the up/down direction, independently of each other, relative to the blow mold.

5. The parison supply device according to claim 1, further comprising a restriction chuck which, gripping a parison discharged from the extrusion die at a first position close to the extrusion die, is moved to a second position farther from the extrusion die than the first position, wherein as to the restriction chuck, before one of the restriction chucks reaches the second position, the other one of the restriction chucks grips the parison at the first position, and then the pair of vertically movable chucks pinch a parison while the pair of restriction chucks are gripping the parison.

6. The parison supply device according to claim 5, wherein a moving speed at which the restriction chuck is moved from the first position to the second position is set higher than a lowering speed of the parison discharged from the extrusion die.

7. The parison supply device according to claim 5, wherein the restriction chuck has a pair of chuck pieces which are moved closer to and farther from each other along a uniaxial direction within a horizontal plane, the chuck pieces each having a recessed part for gripping the parison with the parison maintained in a hollow state.

8. The parison supply device according to claim 5, further comprising a cutter for cutting the parison beneath the restriction chuck, wherein the cutter is moved in a direction perpendicular to the uniaxial direction to cut the parison.

9. A blow molding machine including the parison supply device according to claim 1, wherein the parison pinched by the pair of vertically movable chucks is supplied to one of a plurality of blow molds included in a molding turret which rotates about a vertical axis.

10. The blow molding machine according to claim 9, wherein the pair of vertically movable chucks is provided in a conveying turret which rotates about a vertical axis other than the vertical axis of the molding turret.

11. The blow molding machine according to claim 9, wherein the pair of vertically movable chucks are provided for each of plural blow molds of the molding turret.

12. A blow molding machine including the parison supply device according to claim 1, wherein the pair of vertically movable chucks pinching the parison are moved relative to the blow mold placed in a stationary position.

13. A blow molding machine including the parison supply device according to claim 1, wherein the pair of vertically movable chucks, having been moved along with the blow mold and pinching the parison, are moved upward and downward, respectively, of the blow mold.

14. A blow molding machine including the parison supply device according to claim 1, wherein the chuck operation part moves the pair of vertically movable chucks so that a molded product is separated from the blow mold after molding.

15. The blow molding machine according to claim 14, further comprising:
  a blow device for inserting the blow nozzle into the parison clipped by the blow mold via one chuck out of the pair of vertically movable chucks; and
  an extraction device for receiving, from the pair of vertically movable chucks, a molded product gripped by the pair of vertically movable chucks after opening of the blow mold.

16. The blow molding machine according to claim 15, further comprising a stretch-forming unit for stretch forming part of the parison along the one chuck.

17. The blow molding machine according to claim 16, further comprising a stretch-forming part, as the stretch-forming unit, for press forming part of the pari son clipped by the blow device against the one chuck.

18. The blow molding machine according to claim 16, further comprising a stretch-forming part, as the stretch-forming unit, for blow molding part of the parison between the blow mold and the one chuck.

19. The blow molding machine according to claim 1, wherein the extraction device includes a receiving part for receiving a molded product gripped by the one chuck, and a receiving part for receiving a burr gripped by the other chuck out of the pair of vertically movable chucks.

20. A parison supply method for supplying to a blow mold a parison discharged from an extrusion die, comprising:
  a step of pinching, by an upper-and-lower pair of vertically movable chucks, a parison discharged downward from the extrusion die, wherein the pair of vertically movable chucks perform an operation of pinching the parison while the pair of vertically movable chucks and the parison are being moved downward, and moving the parison to the blow mold by the pair of vertically movable chucks, and one chuck out of the pair of vertically movable chucks includes an opening part which allows the parison to be gripped without closing a one-side opening of the parison, and a blow nozzle is inserted into the opening part.

21. The parison supply method according to claim 20, wherein in the step of pinching the parison by the upper-and-lower pair of vertically movable chucks, the pair of vertically movable chucks are moved downward in accordance with a lowering speed of the parison.

22. The parison supply method according to claim 21, further comprising a parison conveyance step of moving the pair of vertically movable chucks, which have pinched the parison, upward and downward, respectively, of the blow mold, after the step of pinching the parison by the upper-and-lower pair of vertically movable chucks.

23. The parison supply method according to claim 22, wherein in the parison conveyance step, the pair of vertically movable chucks, which have pinched the parison, are moved in an up/down direction or in a direction crossing the up/down direction, independently of each other, relative to the blow mold.

24. A blow molding method using the parison supply method according to claim 22, further comprising the steps of:
  pulling the parison in a discharge direction by operating a plurality of restriction chucks alternately, followed by executing the parison conveyance step, and
  separating a molded product from the blow mold by moving the pair of vertically movable chucks after molding.

* * * * *